US008585483B2

(12) United States Patent
Berman et al.

(10) Patent No.: US 8,585,483 B2
(45) Date of Patent: Nov. 19, 2013

(54) GAMING METHOD AND APPARATUS FOR FACILITATING A GAME INVOLVING BONUS FUNCTIONALITY

(76) Inventors: Bradley Berman, Minnetonka, MN (US); Chad Shapiro, Plymouth, MN (US); Jason Malkovich, Brooklyn Park, MN (US); Jacob Lamb, Maple Grove, MN (US); Peter Berman, Minneapolis, MN (US); Anand Hurkadli, Eden Prairie, MN (US)

( * ) Notice: Subject to any disclaimer, the term of this patent is extended or adjusted under 35 U.S.C. 154(b) by 233 days.

(21) Appl. No.: 12/784,318

(22) Filed: May 20, 2010

(65) Prior Publication Data

US 2010/0298042 A1 Nov. 25, 2010

Related U.S. Application Data

(60) Provisional application No. 61/179,942, filed on May 20, 2009.

(51) Int. Cl.
*G06F 17/00* (2006.01)

(52) U.S. Cl.
USPC .......... 463/20; 463/16

(58) Field of Classification Search
USPC .......... 463/16–21
See application file for complete search history.

(56) References Cited

U.S. PATENT DOCUMENTS 6,632,140 B2 10/2003 Berman et al.
6,997,804 B2 2/2006 Berman
7,338,369 B2 * 3/2008 Mierau et al. .......... 463/20
7,393,278 B2 7/2008 Gerson et al.
7,445,548 B1 11/2008 Muskin
2005/0054412 A1 3/2005 Gauselmann
2006/0025189 A1 * 2/2006 Hollibaugh et al. .......... 463/11
2006/0183530 A1 8/2006 Ellis
2006/0217183 A1 9/2006 Mierau et al.
2006/0264254 A1 11/2006 Aoki
2008/0032775 A1 * 2/2008 Yoshizawa .......... 463/20
2008/0064481 A1 3/2008 Jackson et al.
2008/0200235 A1 8/2008 Yoshizawa
2009/0048013 A1 * 2/2009 Castellari .......... 463/20
2009/0075722 A1 * 3/2009 Louie et al. .......... 463/20
2009/0111563 A1 * 4/2009 Layton .......... 463/20
2009/0203418 A1 * 8/2009 Yoshizawa .......... 463/20
2010/0004049 A1 * 1/2010 Ching et al. .......... 463/20
2010/0120495 A1 * 5/2010 Frank et al. .......... 463/20

OTHER PUBLICATIONS

IGT Phone Tag brochure, 2003, 2 pages.

* cited by examiner

*Primary Examiner* — Michael Cuff

(57) ABSTRACT

Systems, apparatuses and methods for impacting one or more gaming display segments based on their positions relative to presentation of a triggering symbol(s) in another display segment(s). A method involves marking elements of a grid with symbols, where at least one element is marked with a feature symbol. One or more winning combinations of the symbols are identified, where each winning combination may be associated with an award amount according to a paytable. For each of the elements marked with the feature symbol, replacement symbols are marked to the element(s) that is marked with the feature symbol, as well as to those elements adjacent to the element(s) are marked with the feature symbol. One or more additional winning combinations of symbols are then identified, where the additional winning symbol combination (s) includes at least one symbol from the original symbols marked to the plurality of elements and at least one replacement symbol.

41 Claims, 10 Drawing Sheets

GAMING METHOD AND APPARATUS FOR FACILITATING A GAME INVOLVING BONUS FUNCTIONALITY

RELATED APPLICATIONS

This application claims the benefit of Provisional Application No. 61/179,942, filed on May 20, 2009, to which priority is claimed pursuant to 35 U.S.C. §119(e), and which is hereby incorporated herein by reference in its entirety.

FIELD OF THE INVENTION

This invention relates in general to gaming systems and processes, and more particularly to gaming systems, methods and apparatuses for facilitating a game involving random additional play opportunities.

BACKGROUND OF THE INVENTION

Gaming devices such as slot machines have entertained the public for over a century. While the fundamental concept behind slot games has remained relatively intact, the manners of computing, displaying, and participating in modern day slot games have changed dramatically. One force driving these changes is technological advancement, such as the advent of computers and video capabilities. Another driving force is human nature, as the participants of such gaming devices demand continual excitement and stimulation. It is therefore important in the gaming industry that gaming innovations continue to be rolled out to the participating public.

Conventional slot games and the like involve relatively linear game play that can become repetitive and monotonous for a player. For example, a conventional slot machine involves repeatedly spinning three reels in an attempt to line reel symbols up in a configuration that triggers a payout. While the outcome of each game is not predictable, the manner of game play is identical each time the game is played. Such games can have limited ability in sustaining a player's interest as the game play becomes monotonous over time.

SUMMARY

To overcome limitations in the prior art described above, and to overcome other limitations that will become apparent upon reading and understanding the present specification, the present invention discloses systems, apparatuses and methods for providing, among other features, games with random additional play opportunities.

Generally, the present invention provides various manners for impacting one or more gaming display segments (where gaming symbols may be presented) based on its/their positions relative to presentation of a triggering symbol(s) in another display segment(s). The invention may be used in primary gaming activities and/or in secondary (e.g., bonus) gaming activities.

In accordance with one exemplary embodiment, a representative method involves marking elements of a grid (which includes any layout of areas where symbols may be presented) with symbols. In a given gaming activity, at least one element is marked with a feature symbol, where the symbols are typically selected randomly (which is intended to include partial or weighted randomness) for each element. One or more winning combinations of the symbols are identified, where each winning combination may be associated with an award amount according to a paytable. For each of the elements marked with the feature symbol, replacement symbols are provided (marked) to the element(s) that is marked with the feature symbol, as well as to those elements that are adjacent to the element(s) marked with the feature symbol. The replacement symbols are randomly selected for marking, where "randomly" includes any level of randomness. One or more additional winning combinations of symbols are identified, where these one or more additional winning symbol combinations includes at least one symbol from the original symbols marked to the plurality of elements and at least one replacement symbol.

According to a more particular embodiment, this representative method further involves successively marking replacement symbols to elements of the plurality, and identifying one or more additional winning combinations of symbols until at least one of the marking replacement symbols steps fails to mark the feature symbol to the grid.

According to another embodiment of such a method, each of the one or more winning combinations of the symbols is composed of elements of the plurality that are arranged as a series of adjacently located elements and the symbols with which the elements of the series are marked correspond, and each of the one or more additional winning combinations of symbols is composed of elements of the plurality that are arranged as a series of adjacently located elements and the symbols with which the elements of the series are marked correspond.

According to another embodiment of such a method, the elements of the plurality that are marked with replacements symbols based on adjacency to the at least one element of the plurality marked with the feature symbol are deemed adjacent to the at least one element of the plurality marked with the feature symbol based on being positioned immediately above, below, left, or right of any element marked with the feature symbol. In still another embodiment, the elements of the plurality that are marked with replacements symbols based on adjacency to the at least one element of the plurality marked with the feature symbol are deemed to be adjacent to the at least one element of the plurality marked with the feature symbol based on being positioned immediately surrounding the element marked with the feature symbol. Any desired arrangement may be deemed adjacent, including any of horizontal, vertical, diagonal, completely surrounding, etc., relative to the feature symbol, according to various embodiments.

According to yet another embodiment of such a method, each feature symbol is a wild symbol that can correspond to all other symbols for the purpose of forming winning combinations of symbols and additional winning combinations of symbols. In still other embodiments, the feature symbol may be a particular symbol or one of a plurality of particular symbols, such as a symbol that can provide the highest payout if the appropriate number of consecutive ones of that symbol were to occur on a payline.

According to another embodiment of such a method, marking replacement symbols to elements of the plurality and identifying one or more additional winning combinations of symbols are performed such that if an element of the grid is adjacent to two elements that are both marked with feature symbols, then the element will be marked with a replacement symbol and the grid evaluated to identify one or more additional winning combinations of symbols before the element is marked with another replacement symbol and the grid evaluated to identify one or more additional winning combinations of symbols that include the another replacement symbol.

Another embodiment of such a method further involves identifying one or more activated paylines of a plurality of paylines, where each payline is activated based on a wager, and where marking of replacement symbols will only be performed for those feature symbols marked to elements that are in an identified activated payline.

According to another embodiment of such a method, marking the plurality of elements comprises marking each element of the plurality with a primary symbol and further marking at least one element of the plurality with the feature symbol, wherein the feature symbol is marked as a subsymbol; and marking replacement symbols to the elements comprises marking a primary symbol to each of the elements that is marked with the feature symbol or that is adjacent to the elements marked with the feature symbol, wherein each element that is marked with a replacement symbol may be re-marked with the feature symbol as a subsymbol based on a probability.

In accordance with another embodiment of the invention, a computer-readable medium is provided that has instructions stored thereon, where these stored instructions are executable by the processor (which may include one or more cooperatively-operating processors) for facilitating a game having a symbol replacement feature by performing steps including displaying a grid on a display device, the grid comprising a plurality of elements; marking the plurality of elements of the grid with symbols including marking at least one element of the plurality with a feature symbol, the symbols randomly selected for each element of the plurality; evaluating elements of the grid to identify one or more winning combinations of the symbols marked to elements of the plurality, each winning combination associated with an award amount according to a paytable; evaluating elements of the grid to identify which elements are marked with the feature symbol and which elements are adjacent to at least one element marked with the feature symbol; marking replacement symbols to elements of the plurality that are identified to be one or both of marked with the feature symbol and adjacent to at least one element marked with the feature symbol; and evaluating elements of the grid to identify if one or more additional winning combinations of the symbols were marked to elements of the plurality, each of the one or more additional winning combinations of symbols being composed of at least one symbol of the symbols marked to the plurality of elements and at least one replacement symbol.

According to another embodiment, the computer-readable medium has further instructions stored thereon which are executable by the processor for facilitating the game such that each of the steps of marking replacement symbols to elements of the plurality and evaluating elements of the grid to identify one or more additional winning combinations are successively performed until one of the marking replacement symbols steps fails to mark the feature symbol to the grid.

According to still another embodiment, the computer-readable medium has further instructions stored thereon which are executable by the processor for facilitating the game such that the elements of the plurality that are marked with replacements symbols based on adjacency to the at least one element of the plurality marked with the feature symbol are considered to be adjacent to the at least one element of the plurality marked with the feature symbol based on being positioned immediately above, below, left, or right of any element marked with the feature symbol.

According to another embodiment, the computer-readable medium has further instructions stored thereon which are executable by the processor for facilitating the game where each of the one or more winning combinations of the symbols is composed of elements of the plurality that are arranged as a series of adjacently located elements and the symbols with which the elements of the series are marked correspond, and each of the one or more additional winning combinations of symbols is composed of elements of the plurality that are arranged as a series of adjacently located elements and the symbols with which the elements of the series are marked correspond.

According to yet another embodiment, the computer-readable medium has further instructions stored thereon which are executable by the processor for facilitating the game such that the elements of the plurality that are marked with replacements symbols based on adjacency to the at least one element of the plurality marked with the feature symbol are considered to be adjacent to the at least one element of the plurality marked with the feature symbol based on being positioned immediately surrounding the element marked with the feature symbol.

According to another embodiment, the computer-readable medium has further instructions stored thereon which are executable by the processor for facilitating the game such that each feature symbol is a wild symbol that can correspond to all other symbols for the purpose of forming winning combinations of symbols and additional winning combinations of symbols.

According to another embodiment, the computer-readable medium has further instructions stored thereon which are executable by the processor for facilitating the game such that the steps of marking replacement symbols to elements of the plurality and evaluating elements of the grid to identify one or more additional winning combinations are performed such that if an element of the grid is adjacent to two elements that are both marked with feature symbols, then the element will be marked with a replacement symbol and the grid evaluated to identify one or more additional winning combinations of symbols before the element is marked with another replacement symbol and the grid evaluated to identify one or more additional winning combinations of symbols that include the another replacement symbol.

According to still another embodiment, the computer-readable medium has further instructions stored thereon which are executable by the processor for facilitating the game by performing the step of activating one or more paylines of a plurality of paylines, each payline being activated based on a wager, wherein the step of marking of replacement symbols will only be performed for those feature symbols marked to elements that are in an activated payline.

In accordance with another embodiment of the invention, a gaming apparatus is provided that facilitates a game having a symbol replacement feature. The apparatus includes at least a display device and a configured processor. The processor is configured to facilitate display of a grid on the display device, where the grid includes a plurality of elements. The processor is configured to cause the marking of the plurality of elements with symbols including marking at least one element of the plurality with a feature symbol, and to identify one or more winning combinations of the symbols marked to the plurality of elements. The processor is further configured to mark replacement symbols to elements of the plurality that were one or both of marked with the feature symbol and adjacent to the at least one element of the plurality marked with the feature symbol, where the marking of replacement symbols based on the feature symbol having been marked in the grid. The processor is further configured to identify one or more additional winning combinations of symbols, each of the one or more additional winning combinations of symbols composed of at least one symbol from the symbols marked to the plurality of elements and at least one replacement symbol.

According to a more particular embodiment of such an apparatus, the processor is configured to successively perform the marking of replacement symbols to elements of the plurality, and the identifying one or more additional winning combinations of symbols until one of the marking replacement symbols steps fails to mark the feature symbol to the grid.

According to another particular embodiment, the processor is configured such that the elements of the plurality that are marked with replacements symbols based on adjacency to the at least one element of the plurality marked with the feature symbol are considered to be adjacent to the at least one element of the plurality marked with the feature symbol based on being positioned immediately above, below, left, or right of the element marked with the feature symbol.

In another embodiment of such a gaming apparatus, the processor is configured to provide each of the one or more winning combinations of the symbols using elements of the plurality that are arranged as a series of adjacently located elements and the symbols with which the elements of the series are marked correspond, and to provide each of the one or more additional winning combinations of symbols using elements of the plurality that are arranged as a series of adjacently located elements and the symbols with which the elements of the series are marked correspond.

According to another embodiment of the apparatus, the processor is configured to mark the elements of the plurality with replacements symbols based on adjacency to the at least one element of the plurality marked with the feature symbol, wherein the elements are considered to be adjacent to the at least one element of the plurality marked with the feature symbol based on being positioned immediately surrounding the element marked with the feature symbol.

According to still another embodiment of the representative apparatus, the processor is configured to recognize each feature symbol as a wild symbol that can correspond to all other symbols for the purpose of forming winning combinations of symbols and additional winning combinations of symbols.

According to another embodiment of such an apparatus, the processor is configured to mark replacement symbols to elements of the plurality and identify one or more additional winning combinations of symbols by determining that an element of the grid is adjacent to two elements that are both marked with feature symbols, and in response, marking the element with a replacement symbol, and evaluating the grid to identify one or more additional winning combinations of symbols before the element is marked with another replacement symbol and the grid evaluated to identify one or more additional winning combinations of symbols that include the another replacement symbol.

According to yet another embodiment of the gaming apparatus, the processor is further configured to identify one or more activated paylines of a plurality of paylines, each payline being activated based on a wager, wherein the marking of replacement symbols will only be performed for those feature symbols marked to elements that are in an identified activated payline.

According to still another embodiment, the computer-readable medium has further instructions stored thereon which are executable by the processor for facilitating the game such that: marking the plurality of elements of the grid with symbols comprises marking each element of the plurality with a primary symbol and further marking at least one element of the plurality with the feature symbol, wherein the feature symbol is marked as a subsymbol; and marking replacement symbols to the elements comprises marking a primary symbol to each of the elements that is marked with the feature symbol or that is adjacent to the elements marked with the feature symbol, wherein each element that is marked with a replacement symbol may be re-marked with the feature symbol as a subsymbol based on a probability.

In accordance with another embodiment of the invention, a gaming apparatus is provided to facilitate a game having a symbol replacement feature. The apparatus includes a component(s) for displaying a grid having a plurality of elements. The apparatus further includes a component(s) for randomly marking the plurality of elements with symbols including marking at least one element of the plurality with a feature symbol, and for evaluating the grid to identify one or more winning combinations of the symbols marked to the plurality of elements, where each winning combination associated with an award amount according to a paytable. The apparatus includes a component(s) for marking replacement symbols to elements of the plurality that were one or both of marked with the feature symbol and adjacent to the at least one element of the plurality marked with the feature symbol, the marking of replacement symbols based on the feature symbol having been marked in the grid, and the replacement symbols randomly selected for marking. The apparatus further includes a component(s) for evaluating the grid to identify one or more additional winning combinations of symbols, each of the one or more additional winning combinations of symbols composed of at least one symbol from the symbols marked to the plurality of elements and at least one replacement symbol.

According to a more particular embodiment, the representative gaming apparatus includes a component(s) for successively marking replacement symbols to elements of the plurality, and identifying one or more additional winning combinations of symbols, until one of the marking replacement symbols steps fails to mark the feature symbol to the grid.

According to another particular embodiment of the representative gaming apparatus, the elements of the plurality that are marked with replacements symbols based on adjacency to the at least one element of the plurality marked with the feature symbol are considered to be adjacent to the at least one element of the plurality marked with the feature symbol based on being positioned immediately above, below, left, or right of the element marked with the feature symbol.

According to another particular embodiment of the representative gaming apparatus, each of the one or more winning combinations of the symbols is composed of elements of the plurality that are arranged as a series of adjacently located elements and the symbols with which the elements of the series are marked correspond, and each of the one or more additional winning combinations of symbols is composed of elements of the plurality that are arranged as a series of adjacently located elements and the symbols with which the elements of the series are marked correspond.

According to another particular embodiment of the representative gaming apparatus, the elements of the plurality that are marked with replacements symbols based on adjacency to the at least one element of the plurality marked with the feature symbol are considered to be adjacent to the at least one element of the plurality marked with the feature symbol based on being positioned immediately surrounding the element marked with the feature symbol.

According to another particular embodiment of the representative gaming apparatus, each feature symbol is a wild symbol that can correspond to all other symbols for the purpose of forming winning combinations of symbols and additional winning combinations of symbols.

According to another particular embodiment of the representative gaming apparatus, marking replacement symbols to elements of the plurality and identifying one or more additional winning combinations of symbols are performed such that if an element of the grid is adjacent to two elements that are both marked with feature symbols, then the element will be marked with a replacement symbol and the grid evaluated to identify one or more additional winning combinations of symbols before the element is marked with another replacement symbol and the grid evaluated to identify one or more additional winning combinations of symbols that include the another replacement symbol.

According to another particular embodiment, the representative gaming apparatus includes a component(s) for identifying one or more activated paylines of a plurality of paylines, each payline being activated based on a wager, wherein the step of marking of replacement symbols will only be performed for those feature symbols marked to elements that are in an identified active payline.

In accordance with another embodiment, a method involves presenting at least one feature triggering symbol in response to a symbol presentation activity in a grid of paylines of a slot game, and determining first winning payouts from active paylines of the grid. A plurality of symbol locations adjacent to the symbol location of the at least one feature triggering symbol are identified, and replacement symbols are presented in the identified plurality of symbol locations. The method further involves determining second winning payouts from the active paylines of the grid composed of combinations of adjacent symbols of the replacement symbols and the non-replaced symbols.

In some such method embodiments, presenting comprises marking primary symbols to elements of the grid; the at least one feature triggering symbol is a subsymbol relative to the primary symbols; and presenting replacement symbols comprises re-marking primary symbols to the identified plurality of symbol locations and providing an opportunity for each of the identified plurality of symbol locations to also be re-marked with the at least one feature triggering symbol based on a probability.

In accordance with another embodiment, a method involves marking a plurality of elements of a grid with symbols including marking at least one element of the plurality with a feature symbol, identifying one or more winning combinations of the symbols marked to the plurality of elements, marking replacement symbols to a plurality of elements geometrically related to the at least one element marked with the feature symbol, and identifying one or more additional winning combinations of symbols, each of the one or more additional winning combinations of symbols including at least one symbol from the symbols marked to the plurality of elements and at least one replacement symbol.

According to a more particular embodiment, marking replacement symbols to a plurality of elements geometrically related to the at least one element marked with the feature symbol involves marking the replacement symbols to elements positioned adjacent to and along perpendicular axes of the element marked with the feature symbol. In another embodiment, marking replacement symbols to a plurality of elements geometrically related to the at least one element marked with the feature symbol involves marking the replacement symbols to elements positioned adjacent to and along diagonal axes of the element marked with the feature symbol. In yet another embodiment, marking replacement symbols to a plurality of elements geometrically related to the at least one element marked with the feature symbol involves marking the replacement symbols to elements positioned adjacent to and along both perpendicular and diagonal axes of the element marked with the feature symbol. In still another embodiment, marking replacement symbols to a plurality of elements geometrically related to the at least one element marked with the feature symbol comprises marking the replacement symbols positioned a predetermined number of elements from the at least one feature symbol.

These and various other advantages and features of novelty which characterize the invention are pointed out with particularity in the claims annexed hereto and form a part hereof. However, for a better understanding of the invention, its advantages, and the objects obtained by its use, reference should be made to the drawings which form a further part hereof, and to accompanying descriptive matter, in which there are illustrated and described specific examples of an apparatus in accordance with the invention.

BRIEF DESCRIPTION OF THE DRAWINGS

The invention is described in connection with the embodiments illustrated in the following diagrams.

DETAILED DESCRIPTION OF THE ILLUSTRATED EMBODIMENTS

In the following description of the invention, reference is made to the accompanying drawings which form a part hereof, and in which is shown by way of illustration the specific embodiment in which the invention may be practiced. It is to be understood that other embodiments may be utilized, as structural and operational changes may be made without departing from the scope of the present invention.

In conventional slot machine gaming, a player watches for alignment of a series of symbols to trigger payouts, such as horizontal alignment of three cherry symbols. The symbols are typically presented on a plurality of spinning reels (actual reels or graphically depicted reels) and the relative positioning of the reels after spinning determines the symbol alignment and payouts associated with symbol series formation. This conventional game play can become monotonous for a player because the player is essentially looking for one thing as the reels slow down—the alignment of symbols. The present disclosure provides multiple layers of game play which entertain and excite players beyond the predictable manner of game play in a conventional gaming device.

In contrast to the mere lining up of multiple symbols in a conventional slot game, the game aspects of the present disclosure provides game outcomes favorable to the player beyond single stage alignment, while also preserving some spinning reel/symbol alignment aspects liked by players. As will be further described, embodiments of the present disclosure involve multilayered and open ended game play aspects that provide for less predictable manner of game play and therefore greater excitement for the player.

Figure 1A:
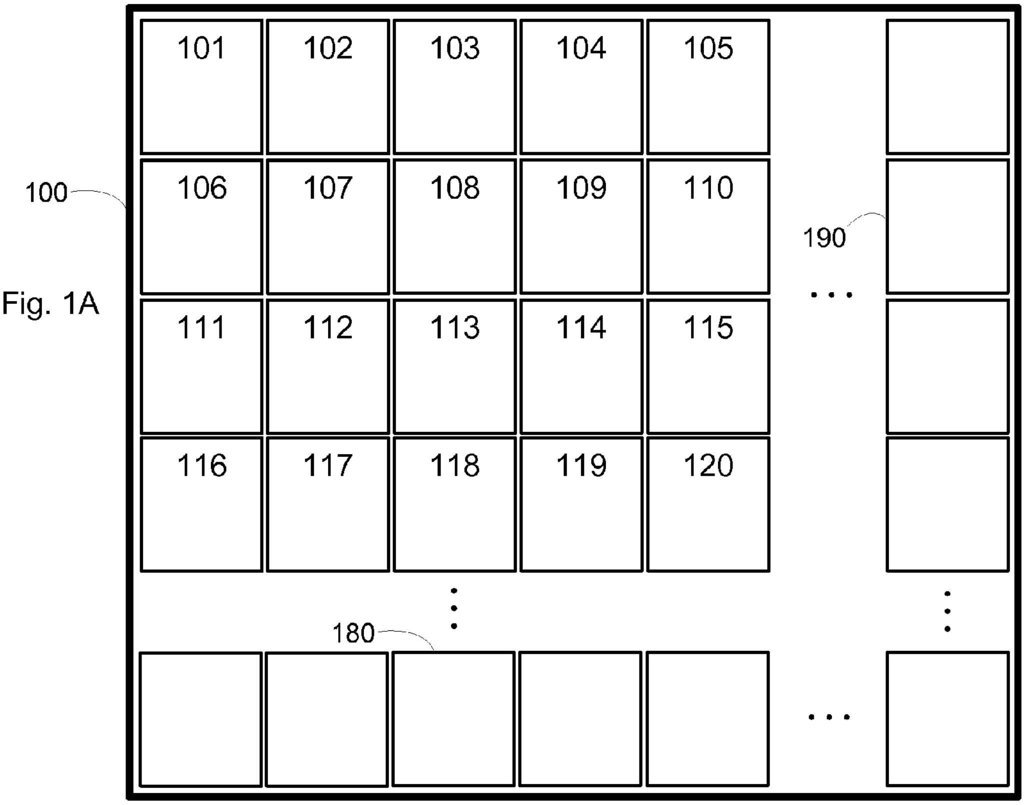
FIGS. 1A-G illustrates an embodiment of a gaming activity utilizing bonus play functionality.

FIG. 1A illustrates a multilayered gaming embodiment. The gaming embodiment of FIG. 1 includes a play area 100 inside of which is a grid composed of a plurality of game elements 101-120. Although the play area 100 of the embodiment of FIG. 1A-G is in the form of a symmetric grid of elements, any arrangement of elements in which symbols can be presented is considered a "grid" for purposes of this description. Thus, a grid includes any formal or informal arrangement or placement of elements and is not intended to be a limiting term, but rather a term used to describe any viewable plurality of elements. FIG. 1A is illustrated having a variable number of additional rows 180 and columns 190 to show that virtually any size grid can be used in accordance with embodiments of the invention, including a grid larger or smaller than that illustrated in FIG. 1A and elsewhere herein.

Figure 1B:
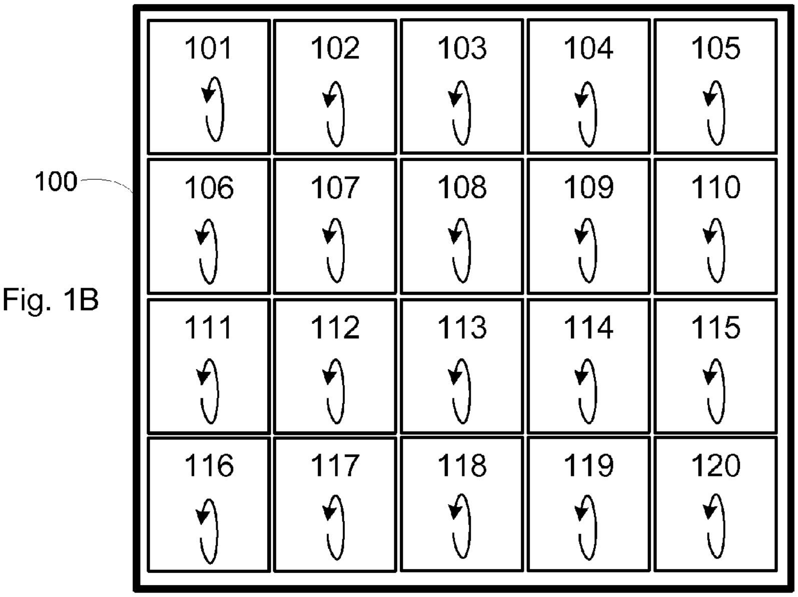

In the stage of game play in FIG. 1A, none of the elements 101-120 have been marked. FIG. 1B illustrates the elements 101-120 being marked with symbols.

In some embodiments, reels are spun to populate the play area 100 with symbols. For example, elements 101-106-111-116 could represent one vertically orientated reel, elements 102-107-112-117 could represent another vertically orientated reel, as so on such that the play area 100 is composed of 5 vertically orientated reels. In some embodiments, play area 100 is represented on a display screen, where animation is used to show the process of marking the elements 101-120 with symbols. FIG. 1B shows circling arrows that are used to graphically represent the process of randomly marking elements 101-120 of the play area (e.g., to represent as if each element 101-120 is spinning and then stopping to display a particular symbol). It should be noted that "randomly" marking elements as used herein does not require (but may involve) pure randomness. For example, in many cases different symbols are weighted differently than others, and may be controlled to ultimately provide a suitable payout percentage. Thus, as used herein, references to "random" do not require absolute randomness. Also, terms referring to "spin" herein refer to a process of selecting one or more markings. Therefore, a re-spin may refer to a process of randomly selecting a marking symbol for an element for re-marking.

Marking, as referred to herein, includes distinguishing at least one element from at least one other element. There are many ways in which one element can be distinguished from another element, and therefore there are many different ways to mark an element. For example, an element could be marked simply by it being created or located in an array or display area. Marking can also include placing and/or representing a symbol, one or more colors, flag, characters, images, graphics, numbers, letters, shapes, features, or designs on, or associated with, an element. In some embodiments, elements are not marked by any symbol, color, letter or numeral, and in those embodiments, the elements themselves can be markings. Distinguishing of elements can be done to physical elements, such as element pieces of a board or on a reel strip. Distinguishing of elements can also be done to elements represented on a display screen.

Marking can be done in various ways. For example, some elements can be randomly marked, such that there is a probability that a particular element will be marked or not marked. Determining whether a particular element will be marked can be done by various means, including random number generation, as discussed herein. If an element is selected to be marked, then another step can be taken to determine which of the possible different types of markings will be used to mark the particular element. However, in some embodiments only one type of marking is available. Moreover, in some embodiments, a process is conducted to randomly select a particular marking for an element, and amongst the different marking outcomes that can be selected is an outcome where the element is not marked.

In some embodiments, only a certain number of elements will be marked and some of the elements will be left unmarked. An evaluation can then be conducted to determine whether, for example, a series of adjacent marked elements was formed to calculate payouts. In some embodiments, all elements of a particular type or grid will be marked and a random number generator or other selection means will be used to determine the particular marking for each element of the type or grid.

Figure 1C:
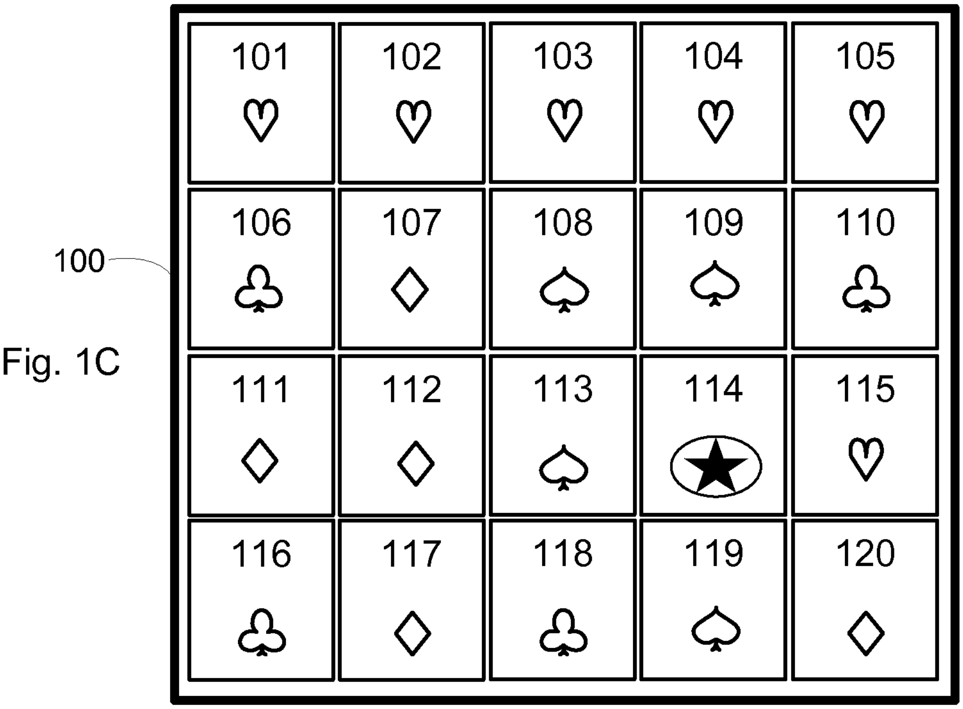
Figure 1D:
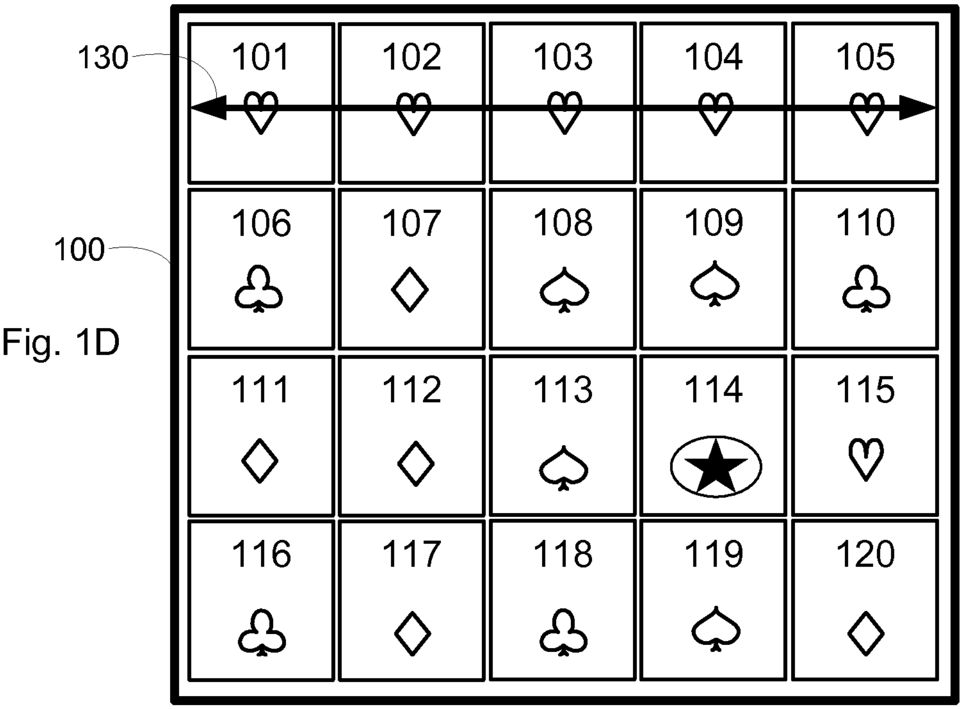

FIG. 1C shows the play area 100 after each element 101-120 has been marked with a respective symbol. For example, element 101 was marked with a heart symbol, element 106 was marked with a club symbol, element 111 was marked with a diamond symbol, element 108 was marked with a spade symbol, and element 114 was marked with a feature symbol (circled star in this embodiment). The various markings of the elements 101-120 can be used to form combinations of corresponding symbols that trigger a payout according to a pay table. FIG. 1D shows the identification of such a combination of adjacent corresponding symbols. Line 130 is used to indicate that elements 101-105 form a combination of adjacent corresponding symbols. Elements 101-105 correspond because each is marked with a common symbol type—hearts.

In the particular embodiment illustrated in FIGS. 1A-G as well as in some others discussed herein, correspondence between elements requires not only identical symbol markings for each element, but also that a minimum number of identically marked elements (or functional equivalents, i.e. wilds) are simultaneously displayed (the minimum being five in the embodiment of FIGS. 1A-G) and that the series spans from the left side of the play area 100 to the right side of the play area 100. As such, even though two diamond symbols are shown in elements 111 and 112, they do not correspond according to the illustrated embodiment, because the threshold number of identical elements for correspondence is five. However, some embodiments contemplated herein are not so limited. Any other number could be required for the elements to correspond, including two identically marked symbols in some embodiments and four in some others, for example.

While elements 101-105 correspond to one another by each having an identical marking, there are various other ways in which elements can correspond to one another, according to various embodiments. For example, elements could correspond to one another not by having the same mark, but rather by just having a mark (e.g., as in embodiments were only some of the elements are marked). In some embodiments, elements will only correspond if they have the same letter, number, symbol, image, color, or other similar marking. In some embodiments, elements will correspond if they are marked with markings selected from a particular group, and the elements need not all have identical markings to correspond to one another. For example, elements may correspond to one another because each is marked with an image of a dog, even though all image markings on the elements are of a different breed of dog.

In some embodiments, elements correspond to one another if their markings form a progressive series. In such embodiments, adjacent elements might only correspond if they are marked with consecutive numbering. In other embodiments, letter marked elements may only correspond if the adjacent elements spell a word. In some embodiments, marked elements may correspond if a word can be spelled from the marked elements of an array, regardless of whether the elements are adjacent to one another.

Elements 101-105 not only correspond to one another, but also help form a series of adjacently located elements, which according to the particular rules of the embodiment of FIGS. 1A-G is required to trigger a payout. There are many different ways in which an element of the various embodiments of the invention can be adjacent to another element. For example, two elements could be considered to be adjacent to one another if they share a common corner. However, various embodiments do not consider the mere sharing of a corner to make two elements adjacent.

Two elements may share a common wall or corner despite there being a small gap illustrated between the framing of each element, as in FIG. 1D. Two square elements may be adjacent in various embodiments because their respective proximate and opposing walls are aligned against one another. Adjacency in this sense, for this particular embodiment, relates to the concept of how the elements of a play area are orientated with respect to each other and not precisely how each element is illustrated.

According to various embodiments, elements in contact with and/or within close proximity to one another can be considered to be adjacent. Elements can be in contact with one another by sharing walls, lines, points, segments, portions and/or features. Elements can also be in contact by overlapping each other. Other types of adjacency may be provided as well. For example, in one embodiment, only those symbols that are adjacent in a horizontal, vertical, or diagonal fashion will be deemed "adjacent" for purposes of providing a payout. Alternatively, only symbols that are horizontal, or that are vertical, or that are diagonal, may be deemed adjacent. Symbols may also be deemed adjacent along opposite edges of the play area, as if the edges were wrapped around to intersect with one another. Three dimensional display grids may also be used in accordance with the embodiments referenced herein, such that elements sharing a wall, corner or segment may be considered to be adjacent.

In various embodiments, a series of corresponding adjacent elements can be dynamically identified. Dynamic identification includes locating winning segments that can take any number of forms. As opposed to classic three reel strip slot matching, where a series of winning symbols could only be formed along one row, dynamic identification allows segments to be formed in many other ways, including segments that repeatedly change direction along their length. For example, a payline moving left-to-right could start in a top row on the left hand side of a play area and end in a lower row on the right side of the play area.

Figure 1E:
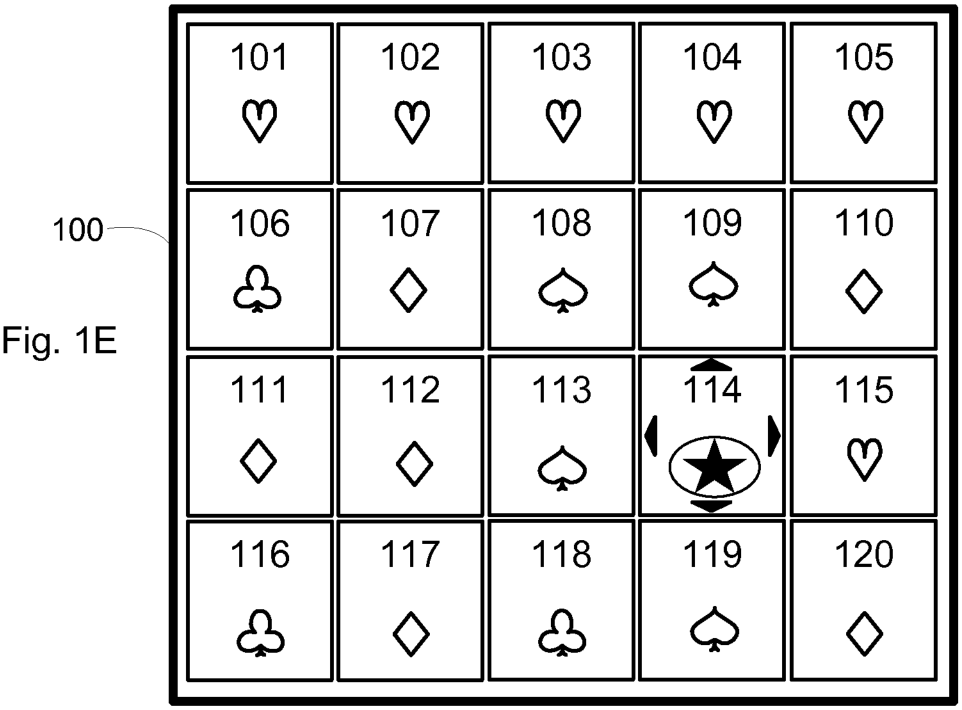
Figure 1F:
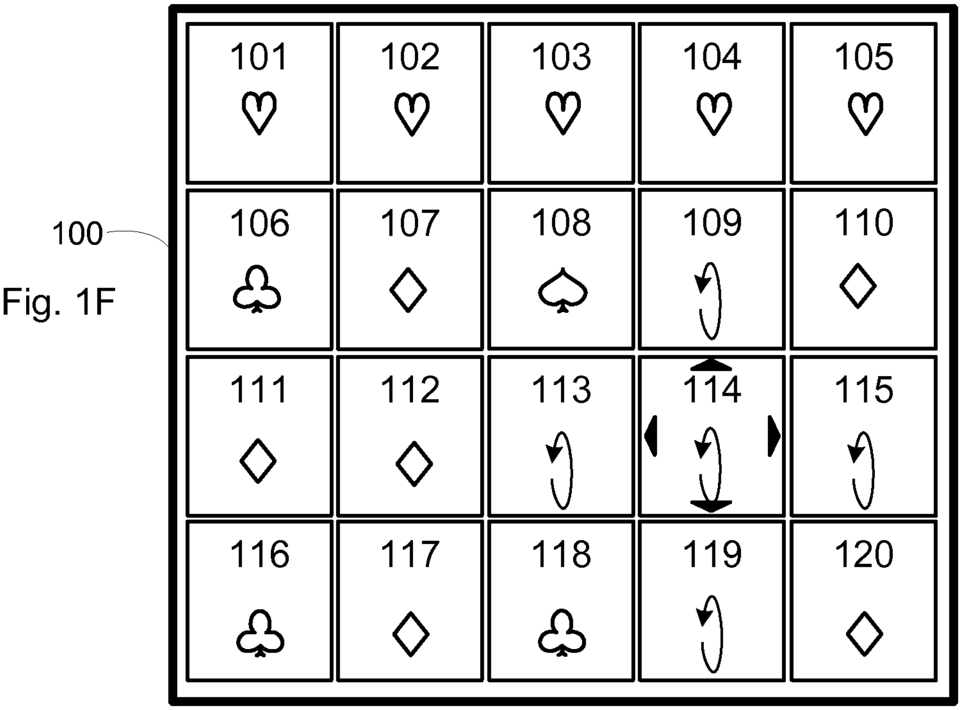
Figure 1G:
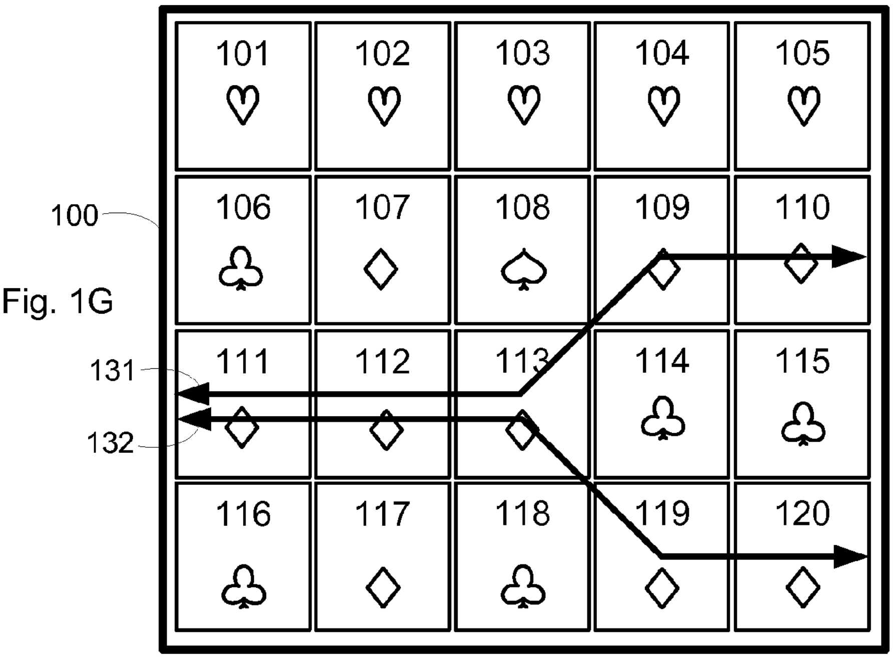
Figure 2:
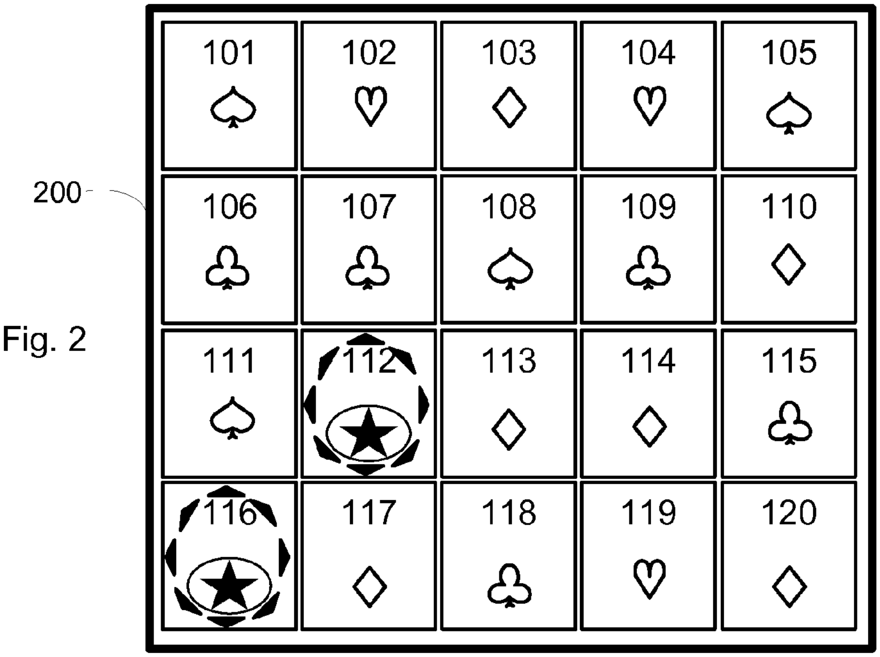
FIG. 2 illustrates an embodiment of a gaming activity utilizing bonus play functionality.

Although the embodiment of FIGS. 1A-2 demonstrate and describe forming winning combinations of symbols from adjacent elements, these and the other embodiments described herein could additionally or alternatively use scatter pay rules, where winning combinations of symbols can be formed without the symbols being marked to elements of an adjacent series.

According to the embodiment of FIGS. 1A-G, as well as various others referenced herein, game elements that are marked with a feature symbol are wild, such as element 114, and exhibit wild functionality. Wild functionality allows a game element to correspond to any other game elements as if the wild element was commonly marked, regardless of how the other game element is marked, to form winning groups of game elements and trigger payouts.

Typical slot based games have a simple manner of game play with a predictable conclusion to play. In contrast to typical slot based games, the embodiment of FIGS. 1A-G, is opened ended and does not have a definite end. Embodiments of this disclosure use a feature symbol to control stages of game play, were the appearance of a feature symbol initiates special rounds of game play unlike the initial round. FIG. 1C shows that a feature symbol was marked to element 114 as part of the play area 100 populating stage of FIG. 1B. In various embodiments, the feature symbol is a multi-function symbol which serves multiple purposes impacting both the current round and at least one subsequent round of game play. For example, in various embodiments including FIGS. 1A-G, the feature symbol serves as a wild symbol for identifying winning combinations of symbols as in the step shown in FIG. 1D. Moreover, the feature symbol triggers additional aspects of game play, including reselection of certain markings in the play area after a first set of winning combinations has already been identified (as in FIG. 1D).

For example, FIG. 1E shows arrows in element 114 pointing at elements 109, 113, 115, and 119. Pointing in this manner indicates that elements 109, 113, 115, and 119 are adjacent to the element 114 marked with the feature symbol. Pointing in this way can also highlight the bonus features of the game to a user, who might be unfamiliar with game play. For example, after the winning symbol combinations have been indicated (as in FIG. 1D), the arrows are then used to foreshadow what happens in the next round of game play. Specifically, the arrows in this case indicate that an aspect of the feature symbol will be extended to a limited number of elements.

According to various embodiments, elements that are marked with a feature symbol and elements that are adjacent to a feature symbol will be re-marked after a first evaluation for symbol combinations (as in FIG. 1D) to provide another chance for winning symbol combinations to be formed. FIG. 1F shows that the symbol markings of elements 109, 113-115, and 119 have been removed and that new symbols are being randomly selected for marking these elements.

FIG. 1G shows that elements 109, 113-115, and 119 have been re-marked with different symbols, allowing for the formation of new combinations of correspondingly marked symbols using the previous marked symbols (e.g., of elements 111 and 112) and symbols that have been added to elements via re-marking (e.g., 113, 109, and 119). In this case, two winning series of adjacent corresponding symbols 131 and 132 have been identified, each composed of diamond symbols that could not have been formed without the re-marking of elements 109, 113-115, and 119 (i.e. would not be formed based on the symbols first marked to the play area 100 and therefore would not have been formed without appearance of the feature symbol).

Although only one feature symbol was presented in FIG. 1C, two or more feature symbols could have been marked to the play area 100 during this stage. Also, multiple feature symbols can be presented at different times. For example, one or more additional feature symbols could have been marked to elements 109, 113-115, and 119 in the re-marking stage of FIGS. 1F-G. Had an additional feature symbol been re-marked to element 109 in the re-marking stage, then elements 104, 108-110, and 114 would have undergone re-marking in the manner shown in FIGS. 1E-G after identification of the winning combinations of corresponding symbols 131 and 132 in FIG. 1G. In this additional re-marking stage, even more feature symbols could have been marked to the play area 100, and for each round of re-marking in which a feature symbol is presented in the play area 100, another round will be initiated. The play area 100 can be evaluated after each marking/re-marking to identify any winning combinations as the play area 100 continues to change and offer more formation opportunities. Game play in this manner can continue indefinitely until a round is played in which no feature symbol is presented to initiate another re-marking.

As shown in FIGS. 1A-G, as well as elsewhere herein, embodiments of this disclosure can provide second (and further) chances for players to form winning combinations of symbols to trigger payouts after an initial round of game play. For example, players are allowed an unlimited number of chances to form winning combinations of elements as long as bonus feature elements are presented in each marking and re-marking stage. In various embodiments, presentation of bonus feature elements themselves do not trigger a payout or mean that a winning combination will be formed. However, presentation of bonus feature elements will be eagerly anticipated by players as they each represent additional chances to form winning combinations.

The use of feature symbols also makes the course of game play unpredictable, as the player does not know how many rounds of game play will occur (dependent on generation of feature symbols) and how many (if any) winning combinations of symbols will be presented. Because the game play as described herein is drawn out over several stages, suspense builds throughout the course of game play, enhancing player excitement and enjoyment. Some players find enjoyment by building off of prior winnings and/or the perception of momentum in a game, of which both aspects can be provided in various embodiments of the invention.

Conventional games typically involve a predetermined rigid path of game play. For example, conventional slot games spin 3 reels with symbols and if symbols align in some manner then a win is triggered. Regardless of the presence of a win or other symbol formation, the game ends. Such games quickly become predictable and repetitive, causing player interest to wane. In embodiments of the present disclosure, the player does not know the winning outcomes, let alone the course of game play, such as how many times elements will be re-marked with symbols. At the start of each game, the player does not know how many rounds will be progressed through, but will be hopeful that many rounds are progressed through because each round increases the chances of formation of at least one winning symbol combination. Players enjoy games that seem as though they could break in favor of the player at any time. Presenting a feature symbol that is wild in one round and that triggers re-marking of adjacent elements in the next round is a great way to give players the impression of momentum and that big wins could be imminent. Such aspects allow a game greater opportunity to surprise a player and therefore always keep the player holding out hope for a re-marking of an element that turns an incomplete series of elements into a complete combination that triggers a win.

In embodiments discussed herein, only a limited number of elements are re-marked following presentation of a feature symbol (as opposed to all elements of a play area, for example). This allows a game to progress though several rounds of marking and evaluation with some continuity. For example, some of the markings in a first round will be present in a second round, while some markings will be different between these two rounds. Continuing with the same game with some of the same elements reinforces that idea that the re-marking is a bonus, as the player gets a second change with some of the same elements. Bonus-inclined players will appreciate attempting to prefect or enhance a previous round verses a total re-population of the board which implies a new game. Also, continuing with the same game by re-marking some of the elements provides the sense of momentum for the player, such that the player feels that he or she is improving on the symbols of the last round and therefore is one step close to a big win.

In FIGS. 1A-F, as well in other embodiments described herein, only those paylines having at least one re-marked element are evaluated for a win after each re-marking. Such a game play aspect encourages a player to enable many paylines at the start of a game (usually associated with a larger wager), as the player will want to enable any payline that could potentially be populated and repopulated in a single game as part of a bonus. Such a game play aspect also underscores why a limited number of elements are re-marked based on presentation of a feature symbol, and in particular adjacent elements. For example, if a feature symbol caused a whole reel to re-spin, then all paylines could be changed by the re-marking warranting another evaluation. But in FIGS. 1A-F, as well as in various other embodiments described herein, the appearance of a feature element causes only a limited portion of a play area to be re-marked, the re-marking therefore not being of consequence for all paylines. If a player does not enable the right payline, then the appearance of an adjacent combination of symbols using one or more re-marked elements is of no consequence if the combination is not along an active payline. As such, game play aspects of the present invention encourage the enabling of many paylines to maximize the benefit of bonus events. In some embodiments, a feature symbol that is not in an active payline will not trigger a re-marking of adjacent elements, which further encourages the enabling of paylines by players.

FIG. 2 illustrates the presentation of two feature symbols (in elements 112 and 116) in a play area 200. Because the feature symbols exhibit wild functionality, elements 112 and 116 can correspond to any other adjacent elements. As such, a series of corresponding adjacent elements is formed by (left-to-right) elements 116, 112, 113, 114, and 110, which are each either wild or marked with a diamond. As such, a winning combination of corresponding elements can be banked before the game proceeds to the next stage of re-marking elements 106-108, 111-113, and 116-118 based on the feature symbols.

The adjacency rules for determining which elements are re-marked based on proximity to a feature symbol are different in FIG. 2 compared to FIGS. 1A-G. Each element 116 and 112 marked with a feature symbol indicates all elements adjacent via side or corner adjacency are to be re-marked. For example, element 112 is marked to indicate that elements 106-108, 111-113, and 116-118 will be re-marked following the evaluation of the play area 200 for winning element combinations. Elements 112 and 116 containing feature symbols are adjacent to each other, via corner adjacency, and elements 111 and 117 are twice indicated to be re-marked because of the proximity of elements 111 and 117 to the elements 112 and 116 containing feature symbols. In some embodiments, elements twice (or other multiple) indicated to be re-marked will be re-marked once, while in other embodiments elements twice indicated to be re-marked will be re-marked twice (or more depending on the number of redundant re-marking indications) and the play area evaluated for winning combinations after each re-marking associated with each feature element, which offers additional opportunities for forming winning combinations. In some embodiments, elements indicated to be re-marked multiple times for a single round will be awarded some other bonus, such as a wild, multiplier, direct payout, or higher paying symbol, without being randomly selected. The other bonus may be provided in addition to, or in lieu of, re-marking multiple times.

Figure 3:
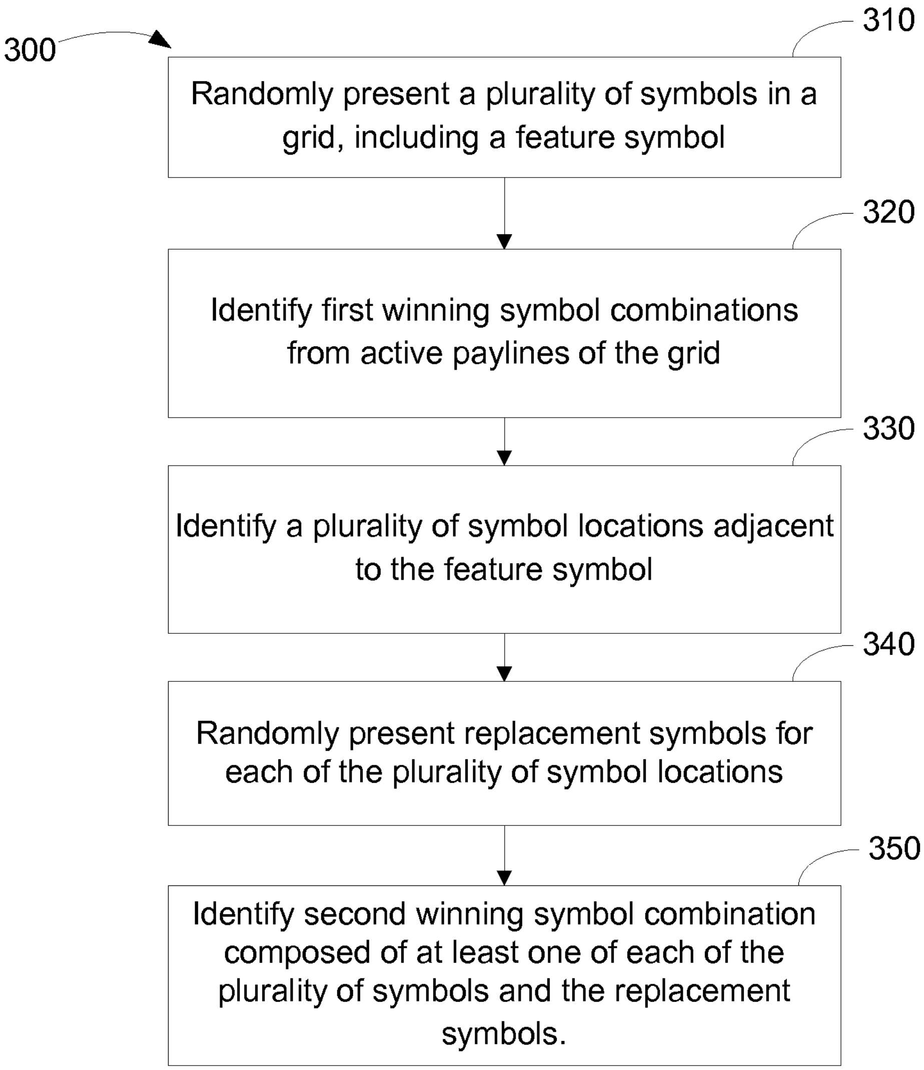
FIG. 3 is a flow diagram of an exemplary embodiment of a method for utilizing bonus play functionality.

FIG. 3 illustrates a flow chart of a method 300 according to the present disclosure for facilitating a game. The method 300 includes randomly presenting 310 a plurality of symbols in a grid, including a feature symbol. The randomly presenting step 310 serves to populate the grid. The manner of presenting 310 can include marking elements of a play area with symbols (e.g., symbols of a card game, as in FIGS. 1A-2). Each marking for each element of the grid can be randomly selected from a plurality of different marking types. For example, the marking types can be heart, diamond, club, spade, and bonus features symbols. In some embodiments, a particular type of marking can be repeatedly used to mark elements, such that a heart symbol could be used any number of times to mark a grid. In other embodiments, a particular type of marking can only be used to mark elements a certain number of times in a particular game or round (e.g., only 5 elements can be marked with a spade symbol). In either case, random selection can be done using selection via a random number generator, as discussed further herein.

After the grid is populated in step 310, active paylines of the grid are evaluated to identify 320 first winning symbol combinations. Identifying 320 can include evaluating all active paylines to determine whether one or more series of correspondingly marked elements were formed by the presenting step 310.

In various embodiments, paylines may need to be enabled (i.e. activated) for a particular game and/or round, including in the method 300 of FIG. 3. For example, a player may be required to place a unique bet for each particular payline for each line to be active for the duration of the game. In such a case, a player not enabling all paylines may be given the opportunity to select which paylines will be enabled, wherein only those paylines that are enabled can be used to form a series of corresponding adjacent elements that triggers a payout. In various embodiments, marked elements will still appear along non-enabled paylines, but adjacent corresponding elements within those series will not trigger a payout and/or will not trigger additional rounds by way of a feature symbol. In some embodiments, a feature symbol in a non-enabled payline may trigger a re-marking round, but a series of adjacent corresponding elements in the same (or different) non-enabled payline will not trigger a payout. Alternatively, a series of adjacent corresponding elements in a non-enabled payline may trigger a payout, but a feature symbol in the same (or different) non-enabled payline will not trigger a re-marking.

Rules regarding the formation of a series of correspondingly marked elements for the method 300 can follow any of the rules referenced herein, such as in association with a pay table. If a series of correspondingly marked elements associated with a payout was formed, then a payout is banked, which can include crediting the player with money.

After and/or during winning combination identification 320, a plurality of symbol locations (e.g., elements of a grid) adjacent to a feature symbol can be identified 330. Identification 330 can include determining which elements are adjacent to the feature symbol (such as by use of a processor in the case of a computer device) and visually highlighting which elements are adjacent to the feature symbol to let the user know which elements are about to be re-marked. It is noted that not all embodiments will require visual identification of which symbol locations are about to be re-marked in a replacement step 340, because upon random replacement of symbols for each of the plurality of symbol locations adjacent to the feature symbol it will be apparent to the player in most embodiments that some of the previously presented 310 symbols are being replaced.

Each of the plurality of symbol locations can be re-marked with replacement symbols that are randomly selected for presentation 340 from all types of symbols that could have been originally presented 310. For example, if diamond, heart, club, spade, and feature symbol types were available to be randomly presented 310, then any of these types of symbols could be presented in the replacement step 340. However, in some embodiments, only those symbol types that actually were presented 310 in the grid in symbol locations not being replaced will be available to be re-marked in the replacement symbol locations. For example, if diamond, heart, club, spade, and feature symbol types were available to be randomly presented 310, but only diamond, heart, club, and feature symbols were actually presented 310, then only these symbol types actually presented 310 can be presented 340 as replacement symbols. Such embodiments provide for a greater chance for wins to be triggered by the replacement feature because the addition of symbol types not already present in the grid are unlikely to form winning combinations, particularly if winning symbol combinations for the second win evaluation 350 must be composed of both original and replacement symbols.

In step 350, the additional winning symbol combinations are composed of at least one symbol from each of the replacement symbols and the plurality of symbols (i.e. originally presented 310 symbols). Such an aspect of the game focuses additional wins on the bonus feature and also prevents symbol combinations untouched by the re-marking from again triggering a payout (e.g., in FIG. 1G, symbols 101-105 are not indicated as containing a winning symbol combination, because this combination was already indicated to trigger a payout in FIG. 1D and does not include any replacement symbols).

Figure 4:
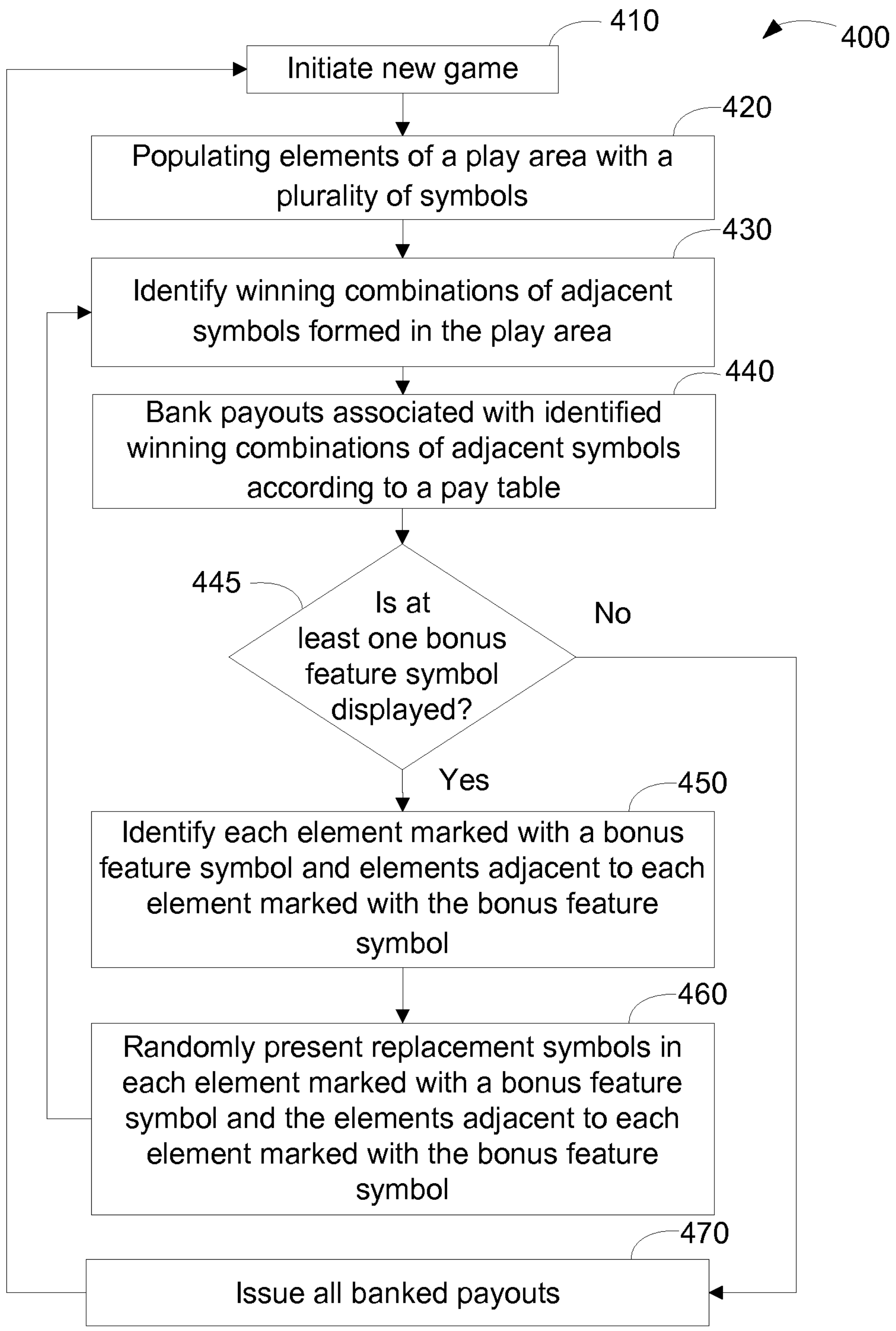
FIG. 4 is a flow diagram of an exemplary embodiment of a method for utilizing bonus play functionality.

Subsequent rounds replacing symbols and identification of more winning symbol combinations (e.g., third, fourth) as in steps 340 and 350, can be performed if the previous random presentation of replacement symbols 340 added a feature symbol, as in step 310. FIG. 4 shows a flow chart of a method 400 further demonstrating such looping of steps.

A game according to the method 400 can be initiated 410 by inserting a coin, pushing a button, pulling a lever, or in some manner placing a wager. Once initiated 410, elements of a play area are populated 420 with a plurality of symbols. Each symbol can be randomly selected from a plurality of symbol types for each element. Winning combinations of adjacent symbols formed in the play area are then identified 430 from those symbols populated 420 to the play area. Based on each identified 430 winning combination, a payout is banked 440. The amount of each payout is based on a pay table. Pay tables prescribe payout amounts for different symbol combinations. Although payouts could be paid immediately after each winning combination is identified 430, the method 400 can loop back to step 430 multiple times in a single game to identify multiple winning combinations at different stages. As such, various embodiments bank 440 payouts to allow the total payout for each game to build up as multiple rounds are looped through, which enhances player excitement as the game repeatedly add to a total payout. Players will enjoy such expansion of a total payout during the time that it is uncertain how long the game will last, where duration of the game is generally correlated with the size of the total payout because a longer game means more opportunities to form winning combinations. Such building of payout amounts over time is attributable to the looping aspect of the game, which is based on use of the feature symbol.

During and/or after banking 440 of payouts for the current round, the method 400 evaluates the play area to determine whether there is at least one feature symbol displayed 445. Such a feature symbol can be displayed when one or more feature symbols are populated 420 to the play area. If no feature symbol is displayed, then the current game ends and all banked payouts, if any, are issued 470.

If at least one feature symbol is displayed, then the method 400 identifies 450 each element marked with a feature symbol and elements adjacent to each element marked with the feature symbol. Such identification 450 does not necessarily comprise visually identifying these spaces, and could be a processor determining which elements are marked with a feature symbol and further which elements are adjacent to each element marked with the feature symbol. Once identified 450, replacement symbols are randomly presented 460 in each element marked (via population 420) with a feature symbol and the elements adjacent to each element marked with the feature symbol. Such re-marking could include adding another feature symbol, which would cause the method 400 to loop through steps 430-440-445-450-460 until step 445 determines that no feature symbols are displayed, ending the game and issuing 470 all banked payouts. Once all payouts are issued 470, a new game can be initiated 410.

FIG. 4 illustrates how the features of the present disclosure make a game unpredictable, not only in outcome but also in the manner that the game is played. Such a game will be more enjoyable to a player for a long period because the game is less predictable as compared to conventional games. Moreover, as opposed to linear game play, the method 400 shows how a player can repeatedly bank 440 payout amounts during the course of game play, which draws out those events that players find most enjoyable—the appearance of symbols that trigger payouts.

FIGS. 1A-4 generally relate to the re-marking of elements adjacent to an element marked with a feature symbol. However, in various embodiments it is not necessarily those elements that are adjacent that are remarked. For example, in some embodiments each element two spaces in an up, down, left, and/or right direction relative to the feature symbol are re-marked. In some embodiments, a ring of elements surrounding, but not adjacent to, the feature symbol element are re-marked. In some embodiments, only the element(s) at the top and/or bottom of the column in which the feature symbol is in are remarked. In some embodiments, only the element(s) at the left end and/or right end of the row in which the feature symbol is in are remarked. It can be appreciated that in some embodiments one or more elements positioned relative to the element marked with the feature symbol are re-marked after the play area is evaluated for wins, which may or may not include an adjacent element.

Various modifications could be made to the embodiments of this disclosure. For example, the presented embodiments generally show re-marking of the element containing the feature symbol that caused the re-marking of adjacent elements (e.g., element 114 in FIGS. 1A-G). However, in some embodiments the feature symbol remains, is not replaced, and no other symbols are added to this element by function of the functionality triggered by the presence of the feature symbol in this element (but in some embodiment may be remarked in connection with an adjacent element being marked with a feature symbol). In such embodiments, one or more properties of the feature symbol and/or element containing the feature symbol may change. One such property is causing further re-marking after this feature symbol triggers a first re-marking of other elements, such that an element containing a feature symbol may cause multiple rounds of re-marking of adjacent elements. Another property can include other bonus functionality, such as multiplier, scatter pay, and/or other bonus.

Property changes can be reflected in the change of appearance associated with the feature symbol or the element containing the feature symbol. Such changes can include, but are not limited to, change in color, transparency, saturation, graphics, text, numerals, and/or scale to represent the change in status to the player. In some embodiments, these appearance changes can become more dramatic with each re-marking, if multiple re-spins are used for a single combination of an element and a feature markings. For example, some feature symbols may cause 3 consecutive re-marking and evaluation rounds of adjacent elements for each appearance of a feature symbol. A color or numeral change for each round can then count down the number of re-marking and evaluation rounds remaining. In such serial re-spins of elements for one feature symbol, other functions could change, such as a multiplier associated with the feature symbol increasing for each round of re-marking and evaluation.

Other options exists for embodiments where the feature symbol causing re-marking is not replaced in a re-spin, even though symbols of adjacent elements can be replaced. For example, a feature symbol may not be replaced by causing its own re-marking, but may be replaced by another element having another feature symbol (e.g., an adjacent element) causing it to be replaced. However, in some embodiments, the feature symbols are exempted from being replaced by re-marking (until the end of the game) such that the feature symbols have permanence and although they are associated with a specialty functionality (re-marking) they can start to fill up a play area and block the appearance of new feature symbols to propagate re-marking and evaluation rounds. In some embodiments, however, the feature symbol is exempted from re-marking by an adjacent feature symbol only for a predetermined number of rounds of re-marking and evaluation, such as one or three rounds, and then is available to be re-marked if caused to be re-marked by an adjacent feature symbol.

In some embodiments, the feature symbol is left in place for a predetermined number of rounds of re-marking and evaluation (i.e. not respun in a first round). In some of these embodiments, a feature symbol could be replaced via re-marking by the presence of another feature symbol in an adjacent element. In some of these embodiments, a feature symbol could be prevented from being replaced for a predetermined number of respinning rounds.

It is noted that while in some embodiments a first element marked with a feature symbol does not itself re-spin (get a new marking) by virtue if it containing a feature symbol, such a first element may still be re-marked in a round of remarking triggered by a second element containing a feature symbol. In such a case, the second element, different from the first element having a feature symbol, may nevertheless cause re-marking of the first element marked with a feature symbol if the second element is appropriately positioned (e.g., adjacent to the first element containing the feature symbol).

Although the criteria generally presented herein for re-marking and re-evaluation of a play area requires the appearance of a feature symbol and other elements with a certain positional association with the element containing the feature symbol (e.g., adjacency), some other embodiments may require satisfaction of further criteria. In some embodiments, a particular symbol in the play area, such as a feature initiate symbol, could be used to determine if the symbols adjacent to the feature symbol element cause a re-marking, the feature initiate symbol unlocking the re-marking abilities of the feature symbol. For example, three scatter re-spin symbols could be used to initiate re-marking in this manner, allowing re-marking of the symbols in elements adjacent to the element containing the feature symbol as described herein.

In some other embodiments, another element outside of the grid and/or play area is used to indicate whether the appearance of a feature symbol will cause the re-marking of elements. In this way, the re-marking of elements is contingent on the state of the outside element. This outside element can be randomly activated, layering another level of randomness and unpredictability to game play. In some embodiments, a message is used to determine if the symbols of elements adjacent to an element containing a feature symbol cause a re-marking. Other indicators for showing whether the feature symbols will be active for causing re-markings include changing a background color of the game screen, lights around the screen, graphical elements, background pattern, texture, insignias, and logos.

In some embodiments, a separate set of elements, apart from the original grid, can be used to spin and display symbols that can meet payout criteria. Such elements may only be populated with premium paying symbols associated with higher payouts relative to the elements of the main grid, and/or could include a higher density of bonuses such as high value symbols, bonus triggers, and feature symbols that themselves can cause re-marking. In this way, the re-marked elements can become enhanced reel strip elements distinguished from the other elements by a higher probability of providing a benefit to a player. A separate set of marking symbols could be used for marking each symbol that qualifies for a re-marking that may include some of the same symbol types originally used for marking (e.g., both include the feature symbol) or they could have entirely different symbols. In some embodiments, a special table that selects 1 symbol and duplicates that symbol for each symbol that qualifies for a re-marking could be used.

In some embodiments, each subsequent re-marking reduces an expected value (i.e. probability of triggering higher paying payouts). Several things can be done to increase the expected value, however. For example, each subsequent re-marking round could award a credit value, regardless of the result. In some embodiments, for each subsequent re-marking round, a multiplier can be introduced that increases in multiplier effect on each subsequent re-marking round (e.g., 2×, 3×, etc.). In some embodiments, for each subsequent re-marking round, a random multiplier from a table of multipliers or other bonus could be assigned. In some embodiments, for each subsequent re-marking round, the composition of the symbols populating the play area grid can be changed, generally to increase award amounts and/or make the formation of award triggering combinations more likely. For example, symbols associated with lower payouts could be removed from some elements of the play area and different markings associated with relatively higher payouts could be re-marked to these elements, wherein the replacement symbol-types were available for marking in the original population of the elements. In some embodiments, symbols associated with lower payouts could be removed from some elements of the play area and different markings associated with relatively higher payouts could be re-marked to these elements, wherein the replacement symbols are premium symbol-types that were unavailable for marking in the original population of the elements.

Many embodiments presented herein generally show re-marking of elements containing the feature symbol that caused the re-marking of adjacent elements (e.g., element 114 in FIGS. 1A-G). However, in some embodiments the feature symbol remains, is not replaced, and no other symbols are added to this element (unless another feature symbols, perhaps in an adjacent element, causes this element to be re-marked).

In some embodiments, the feature symbol only causes re-marking of the adjacent elements in the up, down, left, and right directions, as well as the element marked with the feature symbol itself, and do not cause re-marking of elements through corner adjacency (i.e. elements in a diagonal relationship).

Many of the presented embodiments show that the functionality associated with the feature symbol concerns wild functionality. However, embodiments can be modified such that functionality other than, or in addition to, wild functionality can be used. For example the feature symbol can also represent a rarer symbol that can be combined with other identical symbols to trigger payouts, a scatter pay, a multiplier, and/or other bonus. In some embodiments, the features symbol resembles in some manner other symbols that can be combined to form winning combination of symbols according to a paytable to trigger a payout, while still also triggering a round of re-marking. For example, the feature symbol may include the functionality to re-marked adjacent elements and function as a spade (or other common symbol) for forming combinations without further particular function. As such, the feature symbol could be any symbol-type so long as that symbol is also capable of triggering the re-marking of one or more other elements as discussed elsewhere herein.

Figure 7A:
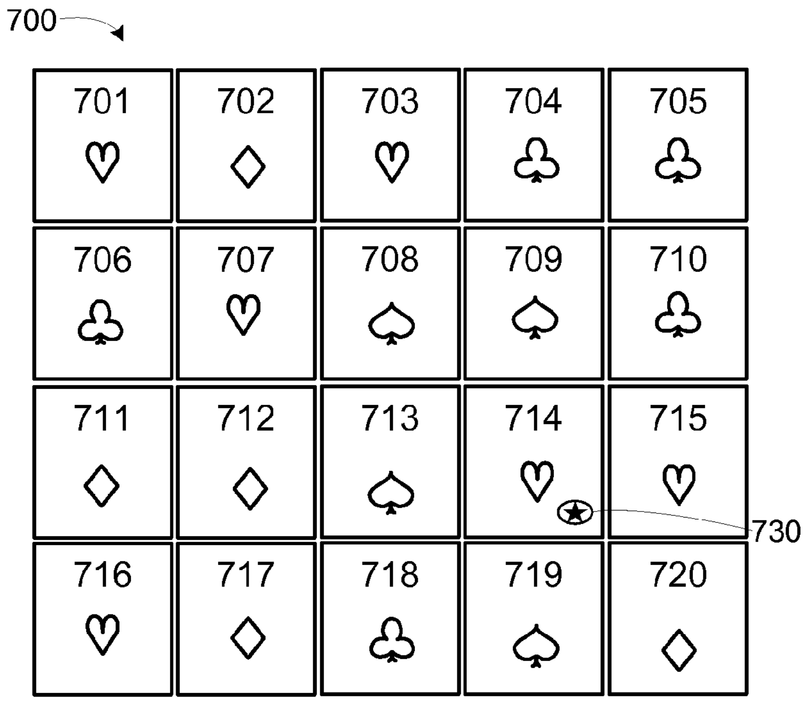
FIGS. 7A-D illustrates an embodiment of a gaming activity utilizing bonus play functionality.

FIGS. 7A-D illustrates an embodiment where the feature symbol is a subsymbol and another primary symbol is commonly marked to the same element in which the feature symbol is marked. FIG. 7A shows elements 701-720 of the play area 700 having been populated by marking symbols (analogous to steps 310 and 420). Each element is marked with a primary symbol from a card theme. Each element has a probability of also being marked with a feature symbol, which is marked as a subsymbol in that an element to which the feature symbol is marked already has a primary symbol. The primary symbol is used for forming winning combinations of symbols while the feature symbol determines which elements will be re-marked with symbols (primary symbols) and which elements will be eligible to be re-marked with a feature symbol (subsymbol). Element 714 has been marked with a heart symbol and with a feature symbol 730. The play area 700 can be evaluated (analogous to steps 320 and 430) at the stage of game play shown in FIG. 7A and any payouts allocated.

Figure 7B:
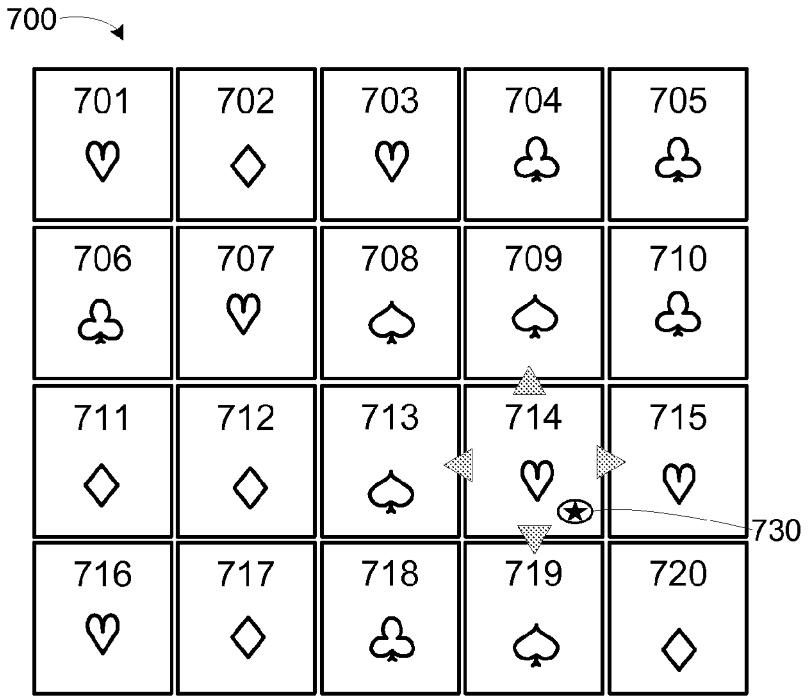
Figure 7C:
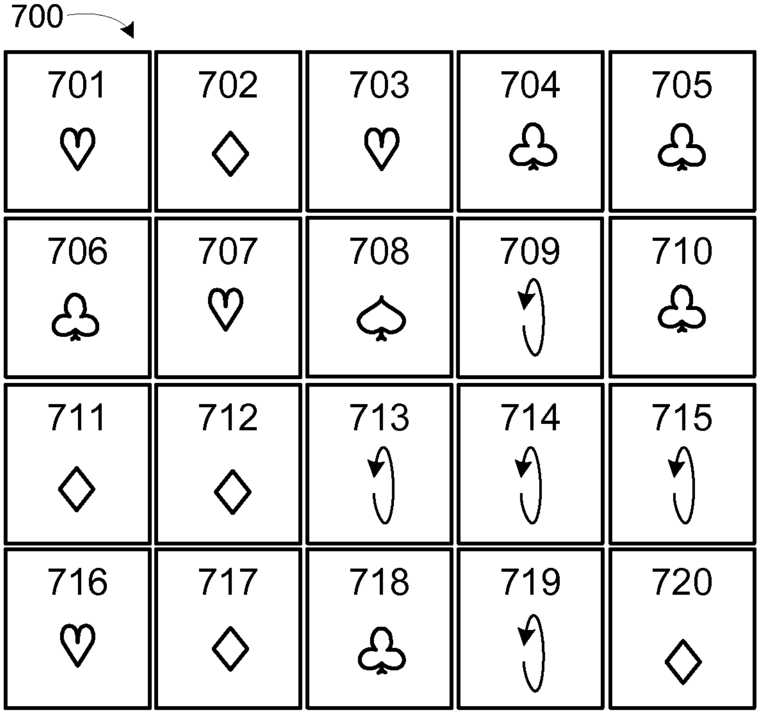
Figure 7D:
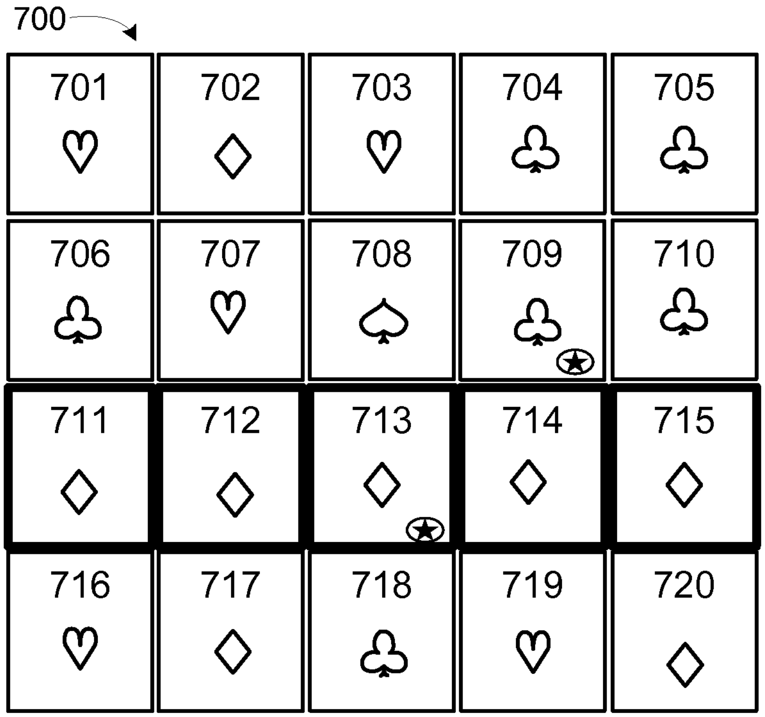

FIG. 7B shows that elements 709, 713, 715, and 719 have been indicated via triangle pointers for re-marking based on side adjacency with element 714 that is marked with the features symbol (analogous to steps 330 and 450). Element 714 could also be likewise indicated because of the presence of the feature symbol 730 within this element 714. FIG. 7C illustrates the re-spinning of the indicated elements for selection of new markings and to determine which, if any, of the indicated elements will be re-marked with a feature symbol, which as discussed herein is based on element 714 being marked with a feature symbol. Such selection for re-marking could be part of steps 340 and 460, the results of which are shown in FIG. 7D. FIG. 7D shows that elements 709, 713-415, and 719 have been re-marked with new primary symbols. This re-marking resulted in the formation of a series of adjacent corresponding elements 711-715 which triggers a payout according to a paytable in this embodiment. As such, the re-marking resulted in a bonus to the player through the use of a feature symbol as a subsymbol. Elements 709 and 713 were also re-marked with feature symbols as subsymbols as part of the re-spin, which will trigger another round of re-marking and evaluation, as demonstrated in the looping flowchart of FIG. 4. It is also noted that the feature symbols are removed upon re-marking in this embodiment.

A feature symbol can be a primary symbol, as in FIGS. 1A-G, or a subsymbol, as in FIGS. 7A-D. These different embodiments also demonstrate that the feature symbol can have functionality to correspond to other symbols, as in FIGS. 1A-G, or a feature symbol may not correspond to other symbols for forming winning combinations as in FIGS. 7A-D and only function to trigger re-marking of elements.

The re-marked elements of the embodiments presented herein, including those of FIGS. 1A-2 and 7A-D, could provide premium elements to replace elements and/or symbols in the process of re-marking. For example, elements 709, 713-715, and 719 could be premium symbols in FIG. 7D based on having been re-marked. Such premium elements and their symbols may be associated with higher paying symbols, awards, more favorable odds for a win, and/or be associated with some other bonus. For example, higher paying symbols may be more likely to be re-marked for the premium elements verses lower paying symbols. The re-marking of premium symbols may consider the presence of adjacent symbols in order to match these symbols and make the formation of wining combinations by re-marking more likely than just random re-marking without such consideration. Symbols of premium elements may remain in place while other elements are re-marked during subsequent re-markings. As such, many elements can be converted over to premium elements if the game loops through several cycles of re-marking Symbols of premium elements may be combined with symbols of non-premium elements to form winning combinations. However, in some embodiments, symbols of premium elements cannot be combined with symbols of non-premium elements, and can only be combined with symbols of other premium elements. In some embodiments, feature symbols are more likely to be re-marked to premium elements relative to non-premium elements. Premium elements may be distinguished by different colors or other physical difference relative to non-premium symbols.

Figure 5:
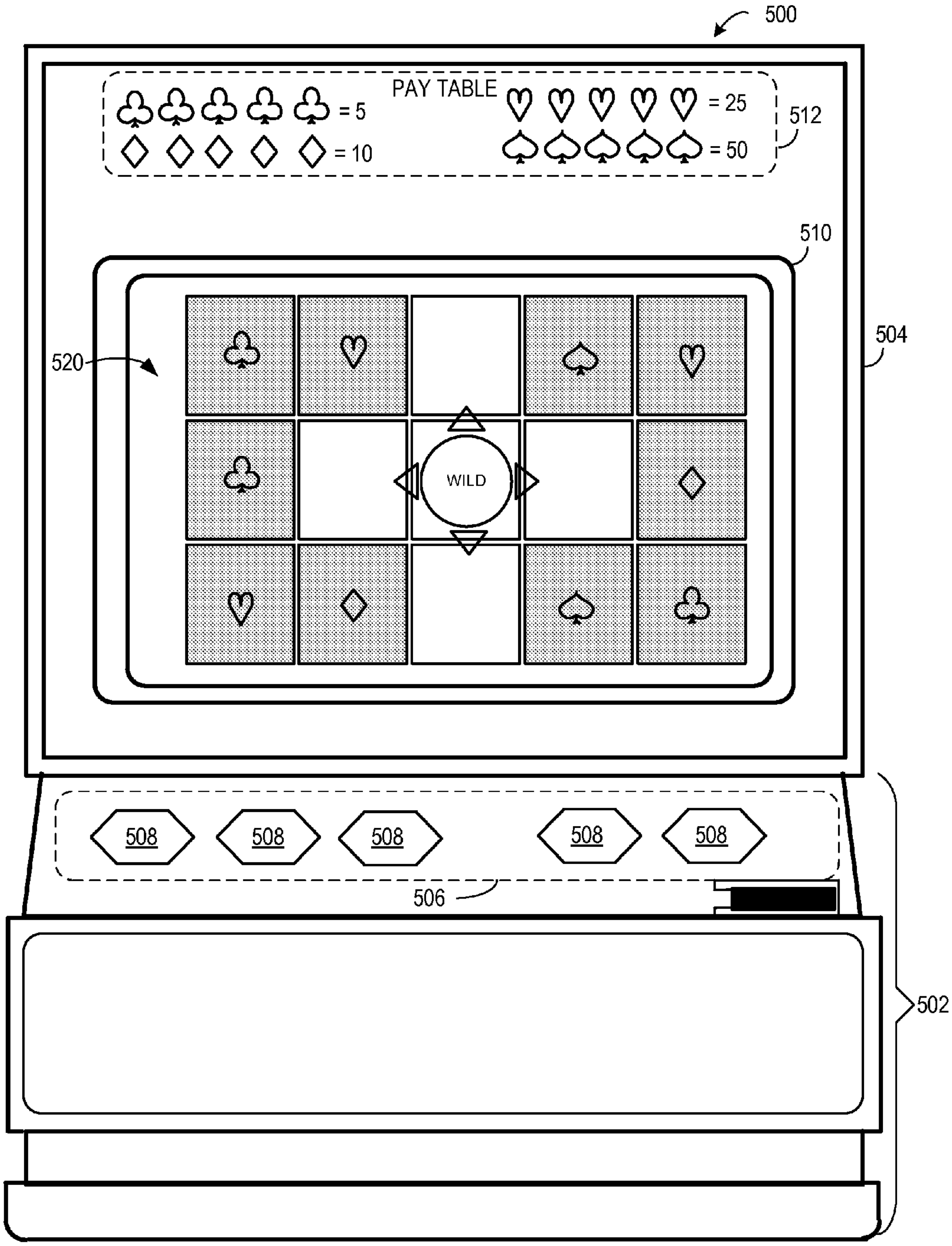
FIG. 5 is an embodiment of a casino-style gaming device in which the principles of the present invention may be applied.

FIG. 5 is an embodiment of a casino-style gaming device in which the principles of the present invention may be applied. The slot machine 500 is a structure including at least a computing system, a housing, and a display. The housing includes a base 502 and a display device 504 to allow the slot machine 500 to be a self-supported, independent structure. The base 502 includes structure supporting the slot machine 500, and also includes a user interface 506 to allow the user to control and engage in play of the slot machine 500. The particular user interface mechanisms associated with user interface 506 is dependent on the type of gaming machine. For example, the user interface 506 may include one or more buttons, switches, joysticks, levers, pull-down handles, trackballs, voice-activated input, or any other user input system or mechanism that allows the user to participate in the particular gaming activity. The user input 506 allows the user to enter coins or otherwise obtain credits through vouchers, tokens, credit cards, etc. Various mechanisms for entering such vouchers, tokens, credit cards, coins, point tickets, etc. are known in the art. For example, coin/token input mechanisms, card readers, credit card readers, smart card readers, punch card readers, and other mechanisms may be used to enter wagers. The user input may include a plurality of buttons 508, which allow the user to initiate game play, enter a number of credits to play, select options, cash out, automatically bet the maximum amount, etc. It should be recognized that a wide variety of other user interface options are available for use, including pressing a button on a gaming machine, touching a segment of a touch-screen, entering text, entering voice commands, or other known user entry methodology.

The display device 504 of FIG. 5 includes a display screen 510. The display device may take on a variety of forms depending on what type of presentation is to be provided. For example, a slot game play area 520 is provided where the slot gaming activity in accordance with the invention is displayed. The slot game play area 520 can function as the play area described herein. The video display screen may be implemented in a variety of manners, including electronically represented with outputs shown on conventional electronic displays, such as a liquid crystal displays (LCD), dot matrix, plasma, CRT, LED, electro-luminescent display, or generally any type of video display known in the art.

Various types of grids, and ways to display them, are contemplated in the scope of the invention, including vertical, horizontal, and/or diagonal lines creating spaces of rectangles and/or squares. A display grid could also be comprised of triangles, hexagons, ovals, circles and other shapes.

A grid can be presented in various ways. For example, a display grid could be comprised of several reel strips with various markings on the periphery of the reel strips. Several reel strips with a common axis placed together can form a grid, with each reel strip representing a vertical column and adjacent markings on the aligned reels representing a horizontal row. A display grid could also be printed or formed on a surface, such as a piece of paper or board. A grid could also be represented by projected light. An array could be presented, modified and used in any way that a grid could be presented.

A display grid can also be presented by use of video means, such as with a video slot machine. In a video slot machine, the reel strips are not represented by physical material, but rather include electronically stored symbol patterns, i.e., a virtual reel strip. By using virtual reel strips for each of the display series, segments or subsegments, there is no physical correlation between display series, segments as there are with mechanical reel strips. For example, in the context of mechanical reel strips, three symbols presented in a column across three paylines are physically restricted to that particular order, since the reel strip is presented across three rows. In some embodiments, there is no such relationship and each subpart of the grid can display a marking independent of any other subpart. Furthermore, there are other advantages by using video representation, including faster game play, greater flexibility in game types and variations, and representation of things that would otherwise be physically complicated or impossible.

Associated with the display device 504 is an optional winning guide area 512, where information associated with the potential winning series lengths may be presented. This area may also provide an indication of the requisite symbols, symbol lengths, symbol combinations, symbol locations, etc. that result in winning payouts to the participant. This information may be part of the display screen 510, or alternatively may be separate from the display screen 510 and provided directly on a portion of the display device 504 structure itself. For example, a backlit colored panel may be used as the winning guide area 512. Further, this information may be provided on an entirely separate display screen (not shown). The winning guide area 512 can display pay table information, as shown.

The gaming machines described in connection with the present invention may be independent casino gaming machines, such as slot machines or other special purpose gaming kiosks, video games, or may be computing systems operating under the direction of local gaming software and/or remotely-provided software such as provided by an application service provider (ASP). The casino gaming machines utilize computing systems to control and manage the gaming activity. An example of a representative computing system capable of carrying out operations in accordance with the invention is illustrated in FIG. 5.

Hardware, firmware, software or a combination thereof may be used to perform the various gaming functions, display presentations and operations described herein. The functional modules used in connection with the invention may reside in a gaming machine as described, or may alternatively reside on a stand-alone or networked computer. The computing structure 600 of FIG. 6 is an example computing structure that can be used in connection with such electronic gaming machines, computers, or other computer-implemented devices to carry out operations of the present invention.

The example computing arrangement 600 typically includes a central processor (CPU) 602 coupled to random access memory (RAM) 604 and some variation of read-only memory (ROM) 606. The ROM 606 may also be other types of storage media to store programs, such as programmable ROM (PROM), erasable PROM (EPROM), etc. The processor 602 may communicate with other internal and external components through input/output (I/O) circuitry 608 and bussing 610, to provide control signals, communication signals, and the like.

Figure 6:
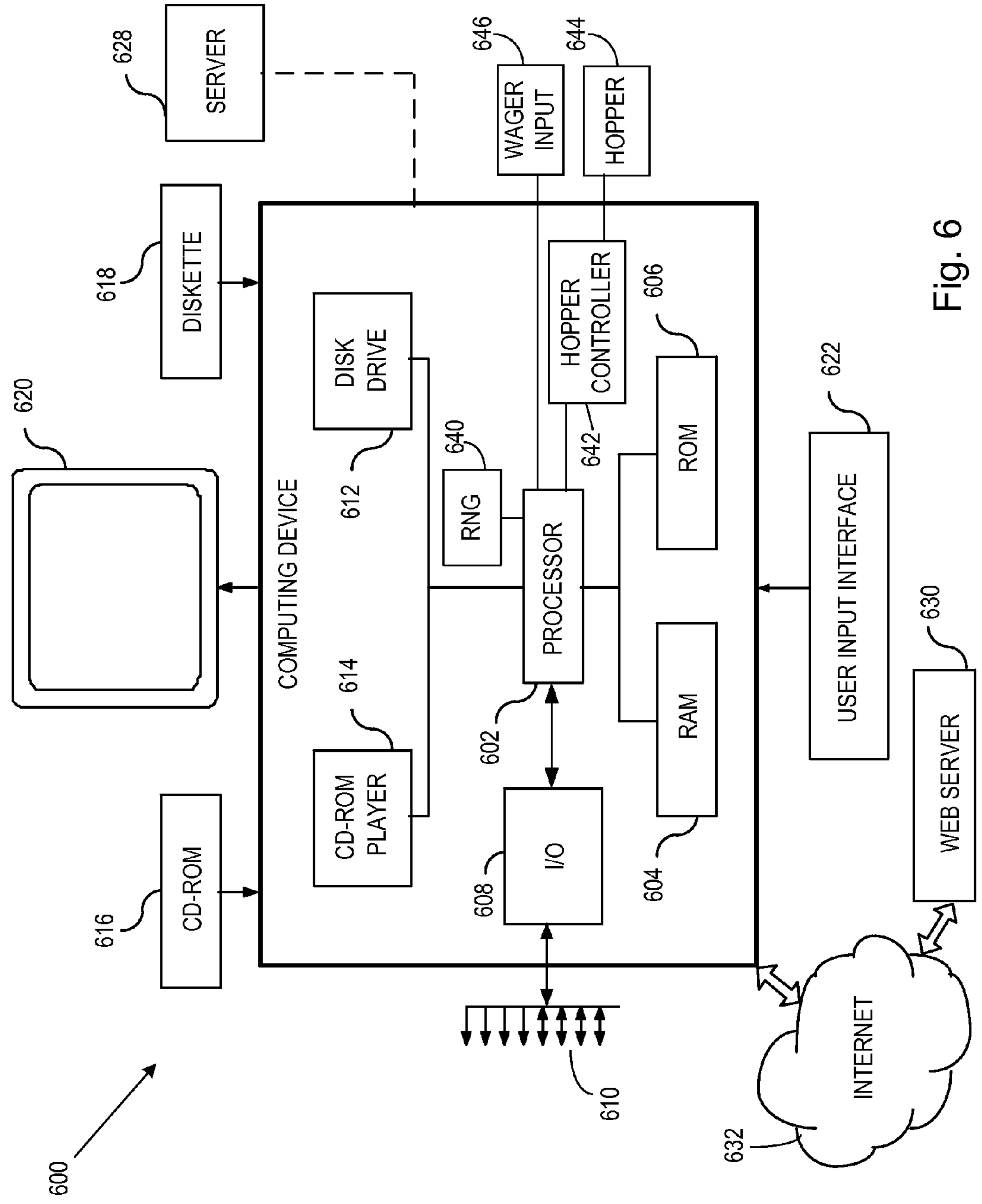
FIG. 6 illustrates circuitry capable of carrying out operations in accordance with aspects of the invention.

The circuitry represented in FIG. 6 can be wholly or partially housed within the embodiment of FIG. 5 and used to perform the various methodologies and techniques discussed herein (e.g., carry out the methods of FIGS. 3 and 4 to provide the game play aspects exhibited in FIGS. 1A-2 and discussed herein). RAM 604 and/or ROM 606 can be a computer readable medium encoded with a computer program, software, firmware, computer executable instructions, instructions capable of being executed by a computer, etc. to be executed by circuitry, such as processor 602. For example, RAM 604 and/or ROM 606 can be a computer readable medium storing a computer program, execution of the computer program by processor 602 causing population of a play area with symbols and at least one feature symbol, identification of winning combinations of symbols, replacement of feature symbols and symbols adjacent to feature symbols, and identification of additional winning combinations composed of replacement and original symbols. In similar ways, the other methods and techniques discussed herein can be performed using the circuitry represented in FIG. 6.

The exemplary device includes a processing/control unit (e.g., 602), such as a microprocessor, reduced instruction set computer (RISC), or other central processing module. The processing unit need not be a single device, and may include one or more processors. For example, the processing unit may include a master processor and one or more associated slave processors coupled to communicate with the master processor.

Chance-based gaming systems such as slot machines, in which the present invention is applicable, are governed by random numbers and processors. Electronic reels are used to display the result of the digital reels which are actually stored in computer memory and "spun" by a random number generator (RNG). RNGs are understood in the art, and may be implemented using hardware, software operable in connection with the processor 602, or some combination of hardware and software. In accordance with generally known technology in the field of slot machines, the processor 602 associated with the slot machine, under appropriate program instruction, can simulate the vertical rotation of multiple reels. Generally, the RNG continuously cycles through numbers, even when the machine is not being played. The slot machine selects, for example, three random numbers. The numbers chosen at the moment the play is initiated are typically the numbers used to determine the final outcome, i.e., the outcome is settled the moment the reels are spun. The resulting random numbers are generally divided by a fixed number. This fixed number is often thirty-two, but for slot machines with large progressive jackpots it may be even greater. After dividing, the remainders will be retained. For example, if the divisor was one-hundred twenty-eight, the machine would have three remainders ranging from zero to one-hundred twenty-seven. The remainders may be considered as stops on virtual reels. If the divisor was one-hundred twenty-eight, then the virtual reels would each have one-hundred twenty-eight stops with each stop being equally likely. Each stop on the virtual reel may be mapped to a stop on an actual reel or displayed reel image. These reel images may then be displayed on the display 620. The present invention is operable using any known RNG, and may be integrally programmed as part of the processor 602 operation, or alternatively may be a separate RNG controller 640. RNGs are well known in the art, and any type of RNG may be implemented for the standard mode of play and/or the bonus mode of play in accordance with the invention. Such methods and devices can be used to select elements for marking and/or symbols to be marked on a particular element, among other things.

The computing arrangement 600 may also include one or more data storage devices, including hard and floppy disk drives 612, CD-ROM drives 614, and other hardware capable of reading and/or storing information such as DVD, etc. In one embodiment, software for carrying out the gaming operations in accordance with the present invention may be stored and distributed on a CD-ROM 616, diskette 618 or other form of media capable of portably storing information. These storage media may be inserted into, and read by, devices such as the CD-ROM drive 614, the disk drive 612, etc. The software may also be transmitted to the computing arrangement 600 via data signals, such as being downloaded electronically via a network, such as the Internet. Further, as previously described, the software for carrying out the functions associated with various embodiments may alternatively be stored in internal memory/storage of the computing device 600, such as in the ROM 606. The computing arrangement 600 is coupled to the display 620, which represents a display on which the gaming activities in accordance with the invention are presented. The display 620 merely represents the "presentation" of the video information in accordance with the invention, and may be any type of known display or presentation screen, such as LCD displays, plasma display, cathode ray tubes (CRT), etc. Where the computing device 600 represents a stand-alone or networked computer, the display 620 may represent a standard computer terminal or display capable of displaying multiple windows, frames, etc. Where the computing device is embedded within an electronic gaming machine, such as slot machine 500 of FIG. 5, the display 620 corresponds to the display screen 510 of FIG. 5. A user input interface 622 such as a mouse or keyboard may be provided where the computing device 600 is associated with a standard computer. An embodiment of a user input interface 622 is illustrated in connection with an electronic gaming machine 500 of FIG. 5 as the various "buttons" 508. Other user input interface devices include a keyboard, a mouse, a microphone, a touch pad, a touch screen, voice-recognition system, etc.

In various embodiments of the invention, various aspects of the game, as described herein, may be player controlled. For example, a player may place bets, select game types, select play area types, select grid types, select array types, select themes, select symbols, select elements, select colors, and/or select markings.

The computing arrangement 600 may be connected to other computing devices or gaming machines, such as via a network. The computing arrangement 600 may be connected to a network server 628 in an intranet or local network configuration. The computer may further be part of a larger network configuration as in a global area network (GAN) such as the Internet. In such a case, the computer accesses one or more web servers 630 via the Internet 632.

Other components directed to slot machine implementations include manners of gaming participant payment, and gaming machine payout. For example, a slot machine including the computing arrangement 600 may also include a hopper controller 642 to determine the amount of payout to be provided to the participant in accordance with a pay table. The hopper controller may be integrally implemented with the processor 602, or alternatively as a separate hopper controller 642. A hopper 644 may also be provided in slot machine embodiments, where the hopper serves as the mechanism holding the coins/tokens of the machine. The wager input module 646 represents any mechanism for accepting coins, tokens, coupons, bills, credit cards, smart cards, membership cards, etc. for which a participant inputs a wager amount.

Using the foregoing specification, the invention may be implemented as a machine, process, or article of manufacture by using standard programming and/or engineering techniques to produce programming software, firmware, hardware or any combination thereof.

Any resulting program(s), having computer-readable program code, may be embodied within one or more computer-usable media such as memory devices or transmitting devices, thereby making a computer program product or article of manufacture according to the invention. As such, the terms "article of manufacture" and "computer program product" as used herein are intended to encompass a computer program existent (permanently, temporarily, or transitorily) on any computer-usable medium such as on any memory device or in any transmitting device.

The present invention is applicable to various gaming activities that are played on a gaming board or gaming machine, including slot games such as reel slots and video slots, and other games utilizing corresponding grid elements to generate a game result. The present invention is described in terms of slot machines to provide an understanding of the invention. While the invention is particularly advantageous in the context of slot machines, and while a description in terms of slot machines facilitates an understanding of the invention, the invention is also applicable to other gaming activities of chance utilizing symbol strings as will be readily apparent to those of skill in the art from the description provided herein.

The circuitry represented in FIG. 6 can be used to perform the various methodologies and techniques discussed herein. For example, RAM 604 can be a computer readable medium encoded with a computer program, software, computer executable instructions, instructions capable of being executed by a computer, etc, to be executed by circuitry, such as processor 602, to cause the various other components, such as user input 622, display 620, hopper controller 642 and hopper 644, RNG 670, etc. to perform the various operations discussed herein.

One skilled in the art of computer science from the description provided herein will be able to combine the software created as described with appropriate general purpose or special purpose computer hardware to create a computer system and/or computer subcomponents embodying the invention, and to create a computer system and/or computer subcomponents for carrying out methods of the invention.

The foregoing description of the exemplary embodiment of the invention has been presented for the purposes of illustration and description. It is not intended to be exhaustive or to limit the invention to the precise form disclosed. Many modifications and variations are possible in light of the above teaching. For example, the present invention is not limited to what is traditionally known as "slot machines." Also, while the illustrated embodiments have been described in large part in connection with a "slot machine," other gaming systems and concepts are also within the scope of the invention, such as video poker games, card games, lotteries, and other casino events implementing a video screen. For example, a video poker game may utilize the present invention to provide multiple cards at each standard card display segment. It is thus intended that the scope of the invention be limited not with this detailed description, but rather by the claims appended hereto.

The following is claimed:

1. A method comprising:

marking a plurality of elements of a grid with symbols including marking one or more elements of the plurality with a feature symbol, the symbols randomly selected for each element of the plurality;

identifying one or more winning combinations of the symbols marked to the plurality of elements, each winning combination associated with an award amount according to a paytable;

thereafter, for each of the one or more elements marked with the feature symbol, marking replacement symbols to the one or more elements that are marked with the feature symbol or that are adjacent to the one or more elements marked with the feature symbol, the replacement symbols randomly selected for marking, wherein marking replacement symbols to the one or more elements that are marked with the feature symbol or that are adjacent to the one or more elements marked with the feature symbol includes:

visibly removing a previously marked symbol from the one or more elements that are marked with the feature symbol or that are adjacent to the one or more elements marked with the feature symbol, and replacing the visibly removed marked symbol with another symbol randomly selected for the respective elements that are marked with the feature symbol or that are adjacent to the one or more elements marked with the feature symbol; and identifying one or more additional winning combinations of symbols, each of the one or more additional winning combinations of symbols including at least one symbol from the symbols marked to the plurality of elements and at least one replacement symbol.

2. The method of claim 1, further comprising successively performing the steps of marking replacement symbols to elements of the plurality and identifying one or more additional winning combinations of symbols until one of the marking replacement symbols steps fails to mark the feature symbol to the grid.

3. The method of claim 1, wherein:

each of the one or more winning combinations of the symbols is composed of elements of the plurality that are arranged as a series of adjacently located elements and the symbols with which the elements of the series are marked correspond; and each of the one or more additional winning combinations of symbols is composed of elements of the plurality that are arranged as a series of adjacently located elements and the symbols with which the elements of the series are marked correspond.

4. The method of claim 1, wherein the elements of the plurality that are marked with replacements symbols based on adjacency to the one or more elements of the plurality marked with the feature symbol are considered to be adjacent to the one or more elements of the plurality marked with the feature symbol based on being positioned immediately above, below, left, or right of any element marked with the feature symbol.

5. The method of claim 1, wherein the elements of the plurality that are marked with replacements symbols based on adjacency to the one or more elements of the plurality marked with the feature symbol are considered to be adjacent to the one or more elements of the plurality marked with the feature symbol based on being positioned immediately surrounding the one or more elements marked with the feature symbol.

6. The method of claim 1, wherein each feature symbol is a wild symbol that can correspond to all other symbols for the purpose of forming winning combinations of symbols and additional winning combinations of symbols.

7. The method of claim 1, wherein the steps of marking replacement symbols to elements of the plurality and identifying one or more additional winning combinations of symbols are performed such that if an element of the grid is adjacent to two elements that are both marked with feature symbols, then the element adjacent to the two feature-marked elements will be marked with a replacement symbol and the grid evaluated to identify one or more additional winning combinations of symbols before the element adjacent to the two feature-marked elements is marked with another replacement symbol and the grid evaluated to identify one or more additional winning combinations of symbols that include the another replacement symbol.

8. The method of claim 1, further comprising identifying one or more activated paylines of a plurality of paylines, each payline being activated based on a wager, wherein the step of marking of replacement symbols will only be performed for those feature symbols marked to elements that are in an identified activated payline.

9. The method of claim 1, wherein:

marking the plurality of elements comprises marking each element of the plurality with a primary symbol and further marking at least one element of the plurality with the feature symbol, wherein the feature symbol is marked as a subsymbol; and marking replacement symbols to the elements comprises marking a primary symbol to each of the elements that is marked with the feature symbol or that is adjacent to the elements marked with the feature symbol, wherein each element that is marked with a replacement symbol may be re-marked with the feature symbol as a subsymbol based on a probability.

10. A computer-readable medium having instructions stored thereon which are executable by the processor for facilitating a game having a symbol replacement feature by performing steps comprising:

displaying a grid on a display device, the grid comprising a plurality of elements;

marking the plurality of elements of the grid with symbols including marking at least one element of the plurality with a feature symbol, the symbols randomly selected for each element of the plurality;

evaluating elements of the grid to identify one or more winning combinations of the symbols marked to elements of the plurality, each winning combination associated with an award amount according to a paytable;

after evaluating elements of the grid to identify one or more winning combinations, evaluating elements of the grid to identify which elements are marked with the feature symbol and which elements are adjacent to at least one element marked with the feature symbol;

marking replacement symbols to elements of the plurality that are identified to be one or both of marked with the feature symbol and adjacent to at least one element marked with the feature symbol; and evaluating elements of the grid to identify if one or more additional winning combinations of the symbols were marked to elements of the plurality, each of the one or more additional winning combinations of symbols being composed of at least one symbol of the symbols marked to the plurality of elements and at least one replacement symbol.

11. The gaming apparatus of claim 10, wherein the computer-readable medium has further instructions stored thereon which are executable by the processor for facilitating the game such that each of the steps of marking replacement symbols to elements of the plurality and evaluating elements of the grid to identify one or more additional winning combinations are successively performed until one of the marking replacement symbols steps fails to mark the feature symbol to the grid.

12. The gaming apparatus of claim 10, wherein the computer-readable medium has further instructions stored thereon which are executable by the processor for facilitating the game such that the elements of the plurality that are marked with replacements symbols based on adjacency to the at least one element of the plurality marked with the feature symbol are considered to be adjacent to the at least one element of the plurality marked with the feature symbol based on being positioned immediately above, below, left, or right of any element marked with the feature symbol.

13. The gaming apparatus of claim 10, wherein the computer-readable medium has further instructions stored thereon which are executable by the processor for facilitating the game such that:

each of the one or more winning combinations of the symbols is composed of elements of the plurality that are arranged as a series of adjacently located elements and the symbols with which the elements of the series are marked correspond; and each of the one or more additional winning combinations of symbols is composed of elements of the plurality that are arranged as a series of adjacently located elements and the symbols with which the elements of the series are marked correspond.

14. The gaming apparatus of claim 10, wherein the computer-readable medium has further instructions stored thereon which are executable by the processor for facilitating the game such that the elements of the plurality that are marked with replacements symbols based on adjacency to the at least one element of the plurality marked with the feature symbol are considered to be adjacent to the at least one element of the plurality marked with the feature symbol based on being positioned immediately surrounding the element marked with the feature symbol.

15. The gaming apparatus of claim 10, wherein the computer-readable medium has further instructions stored thereon which are executable by the processor for facilitating the game such that each feature symbol is a wild symbol that can correspond to all other symbols for the purpose of forming winning combinations of symbols and additional winning combinations of symbols.

16. The gaming apparatus of claim 10, wherein the computer-readable medium has further instructions stored thereon which are executable by the processor for facilitating the game such that the steps of marking replacement symbols to elements of the plurality and evaluating elements of the grid to identify one or more additional winning combinations are performed such that if an element of the grid is adjacent to two elements that are both marked with feature symbols, then the element will be marked with a replacement symbol and the grid evaluated to identify one or more additional winning combinations of symbols before the element is marked with another replacement symbol and the grid evaluated to identify one or more additional winning combinations of symbols that include the another replacement symbol.

17. The gaming apparatus of claim 10, wherein the computer-readable medium has further instructions stored thereon which are executable by the processor for facilitating the game by performing the step of activating one or more paylines of a plurality of paylines, each payline being activated based on a wager, wherein the step of marking of replacement symbols will only be performed for those feature symbols marked to elements that are in an activated payline.

18. The gaming apparatus of claim 10, wherein the computer-readable medium has further instructions stored thereon which are executable by the processor for facilitating the game such that:

marking the plurality of elements of the grid with symbols comprises marking each element of the plurality with a primary symbol and further marking at least one element of the plurality with the feature symbol, wherein the feature symbol is marked as a subsymbol; and marking replacement symbols to the elements comprises marking a primary symbol to each of the elements that is marked with the feature symbol or that is adjacent to the elements marked with the feature symbol, wherein each element that is marked with a replacement symbol may be re-marked with the feature symbol as a subsymbol based on a probability.

19. A gaming apparatus for facilitating a game having a symbol replacement feature comprising:

a display device; and a processor configured to:

facilitate display of a grid on the display device, the grid comprising a plurality of elements;

mark the plurality of elements with symbols including mark at least one element of the plurality with a feature symbol;

identify one or more winning combinations of the symbols marked to the plurality of elements;

thereafter, mark replacement symbols to elements of the plurality that were one or both of marked with the feature symbol and adjacent to the at least one element of the plurality marked with the feature symbol, the marking of replacement symbols based on the feature symbol having been marked in the grid, wherein mark replacement symbols to the one or more elements that are marked with the feature symbol or that are adjacent to the one or more elements marked with the feature symbol includes:

visibly removing a previously marked symbol from the one or more elements that are marked with the feature symbol or that are adjacent to the one or more elements marked with the feature symbol, and replacing the visibly removed marked symbol with another symbol randomly selected for the respective elements that are marked with the feature symbol or that are adjacent to the one or more elements marked with the feature symbol; and identify one or more additional winning combinations of symbols, each of the one or more additional winning combinations of symbols composed of at least one symbol from the symbols marked to the plurality of elements and at least one replacement symbol.

20. The gaming apparatus of claim 19, wherein the processor is configured to successively perform the steps of marking replacement symbols to elements of the plurality and identifying one or more additional winning combinations of symbols until one of the marking replacement symbols steps fails to mark the feature symbol to the grid.

21. The gaming apparatus of claim 19, wherein the processor is configured such that the elements of the plurality that are marked with replacements symbols based on adjacency to the at least one element of the plurality marked with the feature symbol are considered to be adjacent to the at least one element of the plurality marked with the feature symbol based on being positioned immediately above, below, left, or right of the element marked with the feature symbol.

22. The gaming apparatus of claim 19, wherein the processor is configured such that:

each of the one or more winning combinations of the symbols is composed of elements of the plurality that are arranged as a series of adjacently located elements and the symbols with which the elements of the series are marked correspond; and each of the one or more additional winning combinations of symbols is composed of elements of the plurality that are arranged as a series of adjacently located elements and the symbols with which the elements of the series are marked correspond.

23. The gaming apparatus of claim 19, wherein the processor is configured such that the elements of the plurality that are marked with replacements symbols based on adjacency to the at least one element of the plurality marked with the feature symbol are considered to be adjacent to the at least one element of the plurality marked with the feature symbol based on being positioned immediately surrounding the element marked with the feature symbol.

24. The gaming apparatus of claim 19, wherein the processor is configured such that each feature symbol is a wild symbol that can correspond to all other symbols for the purpose of forming winning combinations of symbols and additional winning combinations of symbols.

25. The gaming apparatus of claim 19, wherein the processor is configured such that the steps of marking replacement symbols to elements of the plurality and identifying one or more additional winning combinations of symbols are performed such that if an element of the grid is adjacent to two elements that are both marked with feature symbols, then the element adjacent to the two feature-marked elements will be marked with a replacement symbol and the grid evaluated to identify one or more additional winning combinations of symbols before the element adjacent to the two feature-marked elements is marked with another replacement symbol and the grid evaluated to identify one or more additional winning combinations of symbols that include the another replacement symbol.

26. The gaming apparatus of claim 19, wherein the processor is further configured to identify one or more activated paylines of a plurality of paylines, each payline being activated based on a wager, wherein the marking of replacement symbols will only be performed for those feature symbols marked to elements that are in an identified activated payline.

27. A gaming apparatus for facilitating a game having a symbol replacement feature comprising:

means for displaying a grid having a plurality of elements;

means for marking the plurality of elements with symbols including marking one or more elements of the plurality with a feature symbol, the symbols randomly selected for each element of the plurality;

means for evaluating the grid to identify one or more winning combinations of the symbols marked to the plurality of elements, each winning combination associated with an award amount according to a paytable;

means for thereafter marking replacement symbols to elements of the plurality that were one or both of marked with the feature symbol and adjacent to the one or more elements of the plurality marked with the feature symbol, the marking of replacement symbols based on the feature symbol having been marked in the grid, the replacement symbols randomly selected for marking, wherein marking replacement symbols to the one or more elements that are marked with the feature symbol or that are adjacent to the one or more elements marked with the feature symbol includes:

visibly removing a previously marked symbol from the one or more elements that are marked with the feature symbol or that are adjacent to the one or more elements marked with the feature symbol, and replacing the visibly removed marked symbol with another symbol randomly selected for the respective elements that are marked with the feature symbol or that are adjacent to the one or more elements marked with the feature symbol; and means for evaluating the grid to identify one or more additional winning combinations of symbols, each of the one or more additional winning combinations of symbols composed of at least one symbol from the symbols marked to the plurality of elements and at least one replacement symbol.

28. The gaming apparatus of claim 27, further comprising means for successively performing the steps of marking replacement symbols to elements of the plurality and identifying one or more additional winning combinations of symbols until one of the marking replacement symbols steps fails to mark the feature symbol to the grid.

29. The gaming apparatus of claim 27, wherein the elements of the plurality that are marked with replacements symbols based on adjacency to one or more elements of the plurality marked with the feature symbol are considered to be adjacent to the-one or more elements of the plurality marked with the feature symbol based on being positioned immediately above, below, left, or right of the element marked with the feature symbol.

30. The gaming apparatus of claim 27, wherein:

each of the one or more winning combinations of the symbols is composed of elements of the plurality that are arranged as a series of adjacently located elements and the symbols with which the elements of the series are marked correspond; and each of the one or more additional winning combinations of symbols is composed of elements of the plurality that are arranged as a series of adjacently located elements and the symbols with which the elements of the series are marked correspond.

31. The gaming apparatus of claim 27, wherein the elements of the plurality that are marked with replacements symbols based on adjacency to the one or more elements of the plurality marked with the feature symbol are considered to be adjacent to the one or more elements of the plurality marked with the feature symbol based on being positioned immediately surrounding the element marked with the feature symbol.

32. The gaming apparatus of claim 27, wherein each feature symbol is a wild symbol that can correspond to all other symbols for the purpose of forming winning combinations of symbols and additional winning combinations of symbols.

33. The gaming apparatus of claim 27, wherein the steps of marking replacement symbols to elements of the plurality and identifying one or more additional winning combinations of symbols are performed such that if an element of the grid is adjacent to two elements that are both marked with feature symbols, then the element adjacent to the two feature-marked elements will be marked with a replacement symbol and the grid evaluated to identify one or more additional winning combinations of symbols before the element adjacent to the two feature-marked elements is marked with another replacement symbol and the grid evaluated to identify one or more additional winning combinations of symbols that include the another replacement symbol.

34. The gaming apparatus of claim 27, further comprising means for identifying one or more activated paylines of a plurality of paylines, each payline being activated based on a wager, wherein the step of marking of replacement symbols will only be performed for those feature symbols marked to elements that are in an identified active payline.

35. A method comprising:

presenting at least one feature triggering symbol in response to a symbol presentation activity in a grid of paylines of a slot game;

determining first winning payouts from active paylines of the grid;

identifying a plurality of symbol locations adjacent to the symbol location of the at least one feature triggering symbol;

presenting replacement symbols in the identified plurality of symbol locations, wherein presenting replacement symbols comprises re-marking primary symbols to the identified plurality of symbol locations and providing an opportunity for each of the identified plurality of symbol locations to also be re-marked with the at least one feature triggering symbol based on a probability; and determining second winning payouts from the active paylines of the grid composed of combinations of adjacent symbols of the replacement symbols and the non-replaced symbols.

36. The method of claim 35, wherein:

presenting comprises marking primary symbols to elements of the grid; and the at least one feature triggering symbol is a subsymbol relative to the primary symbols.

37. A method comprising:

marking a plurality of elements of a grid with symbols including marking at least one element of the plurality with a feature symbol;

identifying one or more winning combinations of the symbols marked to the plurality of elements;

marking replacement symbols to a plurality of elements geometrically related to the at least one element marked with the feature symbol, wherein marking replacement symbols to the one or more elements that are marked with the feature symbol or that are adjacent to the one or more elements marked with the feature symbol includes:

visibly removing a previously marked symbol from the one or more elements that are marked with the feature symbol or that are adjacent to the one or more elements marked with the feature symbol, and replacing the visibly removed marked symbol with another symbol randomly selected for the respective elements that are marked with the feature symbol or that are adjacent to the one or more elements marked with the feature symbol; and identifying one or more additional winning combinations of symbols, each of the one or more additional winning combinations of symbols including at least one symbol from the symbols marked to the plurality of elements and at least one replacement symbol.

38. The method of claim 37, wherein marking replacement symbols to a plurality of elements geometrically related to the at least one element marked with the feature symbol comprises marking the replacement symbols to elements positioned adjacent to and along perpendicular axes of the element marked with the feature symbol.

39. The method of claim 37, wherein marking replacement symbols to a plurality of elements geometrically related to the at least one element marked with the feature symbol comprises marking the replacement symbols to elements positioned adjacent to and along diagonal axes of the element marked with the feature symbol.

40. The method of claim 37, wherein marking replacement symbols to a plurality of elements geometrically related to the at least one element marked with the feature symbol comprises marking the replacement symbols to elements positioned adjacent to and along both perpendicular and diagonal axes of the element marked with the feature symbol.

41. The method of claim 37, wherein marking replacement symbols to a plurality of elements geometrically related to the at least one element marked with the feature symbol comprises marking the replacement symbols positioned a predetermined number of elements from the at least one feature symbol.

* * * * *